(12) United States Patent
Garrison

(10) Patent No.: US 11,725,588 B2
(45) Date of Patent: Aug. 15, 2023

(54) INTERSHAFT SEAL ASSEMBLY WITH PRESSURE-BALANCED TRANSLATABLE CARRIER

(71) Applicant: Stein Seal Company, Kulpsville, PA (US)

(72) Inventor: Glenn M. Garrison, Perkiomenville, PA (US)

(73) Assignee: Stein Seal Company, Kulpsville, PA (US)

(*) Notice: Subject to any disclaimer, the term of this patent is extended or adjusted under 35 U.S.C. 154(b) by 213 days.

(21) Appl. No.: 17/311,713

(22) PCT Filed: Jul. 20, 2020

(86) PCT No.: PCT/US2020/042746
§ 371 (c)(1),
(2) Date: Jun. 8, 2021

(87) PCT Pub. No.: WO2022/019878
PCT Pub. Date: Jan. 27, 2022

(65) Prior Publication Data
US 2022/0136447 A1 May 5, 2022

(51) Int. Cl.
*F02C 7/28* (2006.01)
*F16C 32/06* (2006.01)
(Continued)

(52) U.S. Cl.
CPC ............... *F02C 7/28* (2013.01); *F16J 15/006* (2013.01); *F16J 15/3244* (2013.01); *F05D 2220/32* (2013.01); *F05D 2240/55* (2013.01)

(58) Field of Classification Search
CPC ........ F02C 7/28; F16J 15/441; F16J 15/3244; F05D 222/32; F05D 2240/55; F05D 2240/60
See application file for complete search history.

(56) References Cited

U.S. PATENT DOCUMENTS

| 5,014,999 A | 5/1991 | Makhobey |
| 5,015,000 A | 5/1991 | Perini |

(Continued)

FOREIGN PATENT DOCUMENTS

| EP | 0623768 A1 | 11/1994 |
| EP | 2824370 B1 | 1/2020 |
| JP | 2012207663 A | 10/2012 |

OTHER PUBLICATIONS

International Search Report prepared by the Korean Intellectual Property Office under Application No. PCT/US2020/042746, dated Apr. 13, 2021, 5 pages.

(Continued)

*Primary Examiner* — Long T Tran
(74) *Attorney, Agent, or Firm* — Michael Crilly, Esquire

(57) ABSTRACT

An intershaft seal assembly for use between a rotatable outer structure and an inner structure within a turbine engine is presented. The assembly includes a primary sealing ring, a translatable carrier, a secondary sealing ring(s), a lower-pressure chamber, a higher-pressure chamber, a first channel(s), and a second channel(s). The primary ring is disposed within and extends from a circumferential groove about the carrier so as to sealingly engage the rotatable outer structure. The primary ring rotates within the groove and with the rotatable outer structure. Each secondary ring is interposed between the carrier and the inner structure. The carrier slidingly contacts the secondary ring(s). The lower-pressure chamber is generally defined by the carrier and the inner structure adjacent to a higher-pressure side. The higher-pressure chamber is generally defined by the carrier and the inner structure adjacent to a lower-pressure side. Each first channel traverses the carrier so that a gas from the lower-pressure side may enter the lower-pressure chamber. Each second channel traverses the carrier so that a gas from the higher-pressure side may enter the higher-pressure (Continued)

chamber. The sum of the translation-resistant forces ($F_{TTR}$) encountered by the carrier is less than the translation-resistance force ($F_{TR}$) encountered by the primary seal ring.

36 Claims, 10 Drawing Sheets

(51) Int. Cl.
*F01D 11/04* (2006.01)
*F16J 15/00* (2006.01)
*F16J 15/3244* (2016.01)

(56) References Cited

U.S. PATENT DOCUMENTS

| | | |
|---|---|---|
| 5,137,284 A | 8/1992 | Holder |
| 5,195,754 A | 3/1993 | Dietle |
| 5,451,065 A | 9/1995 | Holder |
| 7,370,864 B2 | 5/2008 | Azibert |
| 7,413,194 B2 | 8/2008 | Wright et al. |
| 7,434,813 B1 | 10/2008 | Franceschini et al. |
| 8,657,573 B2 | 2/2014 | Munson |
| 9,429,238 B2 | 8/2016 | Richie et al. |
| 10,330,203 B2 | 6/2019 | Dietle |
| 2012/0261887 A1* | 10/2012 | Vasagar ............... F16J 15/441 277/543 |
| 2013/0251523 A1* | 9/2013 | Garrison ............... F16J 15/441 415/231 |
| 2014/0049009 A1* | 2/2014 | Jahn ............... F16J 15/3464 277/510 |
| 2017/0101879 A1* | 4/2017 | Wotzak ............... F01D 11/003 |
| 2018/0180185 A1* | 6/2018 | Munson ............... F16J 15/4476 |
| 2018/0334960 A1* | 11/2018 | Harral ............... F16N 39/002 |
| 2019/0048931 A1 | 2/2019 | Garrison |

OTHER PUBLICATIONS

Written Opinion of the International Searching Authority prepared by the Korean Intellectual Property Office under Application No. PCT/US2020/042746, dated Apr. 13, 2021, 6 pages.

* cited by examiner $$F_{TTR} = F_{TR1} + F_{TR2} + F_{TR3} + \ldots F_{TRn}$$
$$F_{TR} > F_{TTR}$$

$$F_{TTR} = F_{TR1} + F_{TR2} + F_{TR3} + \ldots F_{TRn}$$
$$F_{TR} > F_{TTR}$$

INTERSHAFT SEAL ASSEMBLY WITH PRESSURE-BALANCED TRANSLATABLE CARRIER

CROSS REFERENCE TO RELATED APPLICATIONS

This application is a National Phase of PCT Application No. PCT/US2020/042746 filed Jul. 20, 2020 entitled Intershaft Seal Assembly with Pressure-Balanced Translatable Carrier which is incorporated in its entirety herein by reference thereto.

GOVERNMENT SPONSORED RESEARCH AND DEVELOPMENT

None.

BACKGROUND OF THE DISCLOSURE

1. Field

The disclosure generally relates to sealing within a turbine engine and more particularly is concerned, for example, with an intershaft seal assembly including a ring disposed within a groove about a translatable carrier between a rotatable outer structure and an inner structure, the latter either fixed or rotatable, wherein the translatable carrier is pressure balanced between a higher-pressure side and a lower-pressure side and the translatable carrier contacts at least one secondary sealing ring which permits the carrier to axially translate when in contact with the sealing ring.

2. Background Art

Intershaft sealing is applicable within a turbine engine between a rotating runner and a fixed frame, or between a pair of co-rotating shafts, or between a pair of counter-rotating shafts.

Referring now to FIG. 1, an exemplary intershaft assembly 1 known within the art is shown for a paired-arrangement of shafts 3, 4 rotatable about an axis 5 between a higher-pressure side 7 at an upstream end and a lower-pressure side 8 at a downstream end. A carbon sealing ring 2 is disposed within a groove 6 about the inner shaft 4 so as to partially extend from the groove 6 in the direction of the outer shaft 3. The sealing ring 2 and the groove 6 are radially sized to avoid contact between the inner diameter of the sealing ring 2 and the bottom of the groove 6. The sealing ring 2 and the groove 6 are axially sized to provide a close axial clearance to minimize leakage from the higher-pressure side 7 to the lower-pressure side 8. The sealing ring 2 further includes a gap (not shown) which permits the sealing ring 2 to centrifugally expand opposite to the inner shaft 4 so as to contact the inner diameter of the outer shaft 3 as the latter rotates. The expansion of the sealing ring 2 causes the sealing ring 2 to push against the inner diameter of the outer shaft 3. The resultant coupling causes the sealing ring 2 to rotate within the groove 6 with little or no axial wear to faces 10 of the sealing ring 2. However, excessive wear along a face 10 often occurs whenever thermal and/or other condition(s) within a turbine engine cause the outer shaft 3 and/or the inner shaft 4 to translate 9 thereby pushing a face 10 of the sealing ring 2 into contact with a wall 11 of the groove 6.

The sealing ring 2 exerts a centrifugal force ($F_C$) onto the inner diameter of the outer shaft 3 during operation of a turbine engine. The sealing ring 2 is held in place along the outer shaft 3 via a translation-resistance force ($F_{TR}$). The translation-resistance force ($F_{TR}$) corresponds to the axial force which must be applied onto the sealing ring 2 so as to initiate axial translation via sliding relative to the outer shaft 3. The translation-resistance force ($F_{TR}$) is typically calculated by multiplying the centrifugal force ($F_C$), after adjustments for the radial pressure forces ($+F_{R1}$, $-F_{R2}$), by the coefficient of friction ($C_F$) between the outer shaft 3 and the sealing ring 2. The maximum contact force communicated onto a face 10 of the sealing ring 2 when contacted by a wall 11 of the groove 6 is determined by the translation-resistance force ($F_{TR}$) which in turn directly influences the frictional wear and the frictional heating of the sealing ring 2.

It is often necessary to rotate an outer shaft 3 at a higher speed in order to improve performance of a turbine engine. The knock-on effects are a higher centrifugal force ($F_C$) which increases with the square of rotational speed, a correspondingly higher translation-resistance force ($F_{TR}$) at contact between the sealing ring 2 and the outer shaft 3, and greater frictional wear and heating whenever a translation causes a face 10 of the sealing ring 2 to contact a wall 11 of the groove 6.

The operational life of a sealing ring 2 is maximized by minimizing both frictional wear and frictional heating; therefore, improved engine performance with respect to power, efficiency, and/or other metric(s) is often at the expense of seal life. The end results may include more frequent maintenance and higher operating costs over the lifespan of a turbine engine.

The related arts do not include an intershaft seal assembly that mitigates frictional face wear and frictional heating with respect to a sealing ring imposed by the translation-resistance force along the interface between a sealing ring and a rotatable outer structure at higher centrifugal forces.

Accordingly, what is required is an intershaft sealing arrangement for use within a turbine engine which is capable of mitigating frictional face wear along a sealing ring and frictional heating to a sealing ring, both indirectly associated with the translation-resistance force along the interface between a sealing ring and a rotatable outer structure at higher centrifugal forces.

SUMMARY

An object of the disclosure is an intershaft sealing arrangement for use within a turbine engine which is capable of mitigating frictional face wear along a sealing ring and frictional heating to a sealing ring, both indirectly associated with the translation-resistance force along the interface between a sealing ring and a rotatable outer structure at higher centrifugal forces.

In accordance with embodiments of an intershaft seal assembly for use between a rotatable outer structure and an inner structure within a turbine engine, the assembly includes a primary sealing ring, a translatable carrier, at least one secondary sealing ring, a lower-pressure chamber, a higher-pressure chamber, at least one first channel, and at least one second channel. The translatable carrier is interposed between a lower-pressure side and a higher-pressure side. The primary sealing ring is disposed within and extends from a circumferential groove about the translatable carrier so as to sealingly engage an inner diameter surface of the rotatable outer structure. The primary sealing ring rotates with the rotatable outer structure. Each secondary sealing ring is interposed between the translatable carrier and the inner structure. The translatable carrier slidingly contacts the secondary sealing ring(s). The lower-pressure chamber is formed by the translatable carrier and the inner structure adjacent to the higher-pressure side. The higher-pressure chamber is formed by the translatable carrier and the inner structure adjacent to the lower-pressure side. Each first channel traverses the translatable carrier so as to permit a lower-pressure gas from the lower-pressure side to enter the lower-pressure chamber. Each second channel traverses the translatable carrier so as to permit a higher-pressure gas from the higher-pressure side to enter the higher-pressure chamber.

In accordance with other embodiments, the rotatable outer structure is a runner and the inner structure is a non-rotatable frame.

In accordance with other embodiments of an intershaft seal assembly, the rotatable outer structure is an outer shaft and the inner structure is an inner shaft. In accordance with other embodiments of an intershaft seal assembly, the inner shaft is rotatable.

In accordance with other embodiments of an intershaft seal assembly, the inner shaft is not rotatable.

In accordance with other embodiments of an intershaft seal assembly, the primary sealing ring includes a pair of faces and at least one face includes at least one hydrodynamic groove.

In accordance with other embodiments of an intershaft seal assembly, at least one secondary sealing ring is spring energized and arranged to sealingly contact the translatable carrier and the inner structure.

In accordance with other embodiments of an intershaft seal assembly, at least one secondary sealing ring is a piston ring disposed within a groove about the inner structure wherein each secondary sealing ring is arranged to sealingly contact the translatable carrier and the inner structure.

In accordance with other embodiments of an intershaft seal assembly, the primary sealing ring includes a pair of faces and at least one secondary sealing ring permits the translatable carrier to move relative to the inner structure when the translatable carrier comes in contact with one face.

In accordance with other embodiments of an intershaft seal assembly, a total translation-resistance force between the translatable carrier and the secondary sealing ring(s) is less than a translation-resistance force between the rotatable outer structure and the primary sealing ring.

In accordance with other embodiments of an intershaft seal assembly, the lower-pressure gas within each of the lower-pressure side and the lower-pressure chamber exerts an axial pressure force wherein the axial pressure force within the lower-pressure side opposes the axial pressure force within the lower-pressure chamber.

In accordance with other embodiments of an intershaft seal assembly, the axial pressure forces exerted by the lower-pressure gas are equal.

In accordance with other embodiments of an intershaft seal assembly, the higher-pressure gas within each of the higher-pressure side and the higher-pressure chamber exerts an axial pressure force wherein the axial pressure force within the higher-pressure side opposes the axial pressure force within the higher-pressure chamber.

In accordance with other embodiments of an intershaft seal assembly, the axial pressure forces exerted by the higher-pressure gas are equal.

In accordance with other embodiments of an intershaft seal assembly, the lower-pressure gas within the lower-pressure side and the higher-pressure gas within the higher-pressure chamber separately exert a first pair of axial pressure forces and the higher-pressure gas within the higher-pressure side and the lower-pressure gas within the lower-pressure chamber separately exert a second pair of axial pressure forces.

In accordance with other embodiments of an intershaft seal assembly, the first pair of axial pressure forces are opposed by and in total equal to the second pair of axial pressure forces.

In accordance with other embodiments of an intershaft seal assembly, each first channel includes an inlet end communicable with the lower-pressure side and an outlet end communicable with the lower-pressure chamber.

In accordance with other embodiments of an intershaft seal assembly, each second channel includes an inlet end communicable with the higher-pressure side and an outlet end communicable with the higher-pressure chamber.

In accordance with other embodiments of an intershaft seal assembly, the translatable carrier includes a center portion with the circumferential groove thereon and a pair of flange portions which oppositely extend from the center portion.

In accordance with other embodiments of an intershaft seal assembly, slots disposed along one flange portion separately engage tabs extending from the inner structure wherein interaction between the slots and the tabs limits translation of the translatable carrier with respect to the inner structure and prevents rotation of the translatable carrier relative to the inner structure.

In accordance with other embodiments of an intershaft seal assembly, one secondary sealing ring is interposed between and contacts one flange portion and the inner structure.

In accordance with other embodiments of an intershaft seal assembly, one secondary sealing ring is interposed between and contacts the center portion and the inner structure.

In accordance with other embodiments of an intershaft seal assembly, one secondary sealing ring cooperates with one flange portion, the center portion, and the inner structure to form the lower-pressure chamber.

In accordance with other embodiments of an intershaft seal assembly, the flange portions are disposed about the center portion in a symmetric arrangement.

In accordance with other embodiments of an intershaft seal assembly, the flange portions are disposed about the center portion in an asymmetric arrangement.

In accordance with other embodiments of an intershaft seal assembly, the inner structure is an inner shaft which includes a shaft portion and a sleeve portion wherein the sleeve portion is disposed about, contacts, and is movable with the shaft portion and wherein the sleeve portion is interposed between the translatable carrier and the shaft portion.

In accordance with other embodiments of an intershaft seal assembly, at least one secondary sealing ring is a piston ring disposed within a groove about the sleeve portion and arranged to sealingly contact the translatable carrier and the sleeve portion.

In accordance with other embodiments of an intershaft seal assembly, at least one tertiary sealing ring is disposed between and sealingly contacts the sleeve portion and the shaft portion.

In accordance with other embodiments of an intershaft seal assembly, at least one tertiary sealing ring is an O-ring.

In accordance with other embodiments of an intershaft seal assembly, the assembly further includes a second primary sealing ring and a second circumferential groove. The second circumferential groove is disposed about the translatable carrier. The second primary sealing ring is disposed within and extends from the second circumferential groove so as to sealingly engage the inner diameter surface of the rotatable outer structure. The second primary sealing ring rotates with the rotatable outer structure.

In accordance with other embodiments of an intershaft seal assembly, the second primary sealing ring includes a pair of second faces and at least one second face has at least one hydrodynamic groove.

In accordance with other embodiments of an intershaft seal assembly, the second primary sealing ring includes a pair of second faces. At least one secondary sealing ring permits the translatable carrier to move relative to the inner structure when the translatable carrier comes in contact with one second face.

In accordance with other embodiments of an intershaft seal assembly, the second circumferential groove has a pair of walls. The second primary sealing ring is disposed between the walls and at least one wall has at least one hydrodynamic groove.

In accordance with other embodiments of an intershaft seal assembly, the translatable carrier includes a center portion disposed between and integral to a pair of flange portions.

In accordance with other embodiments of an intershaft seal assembly, the translatable carrier includes a center portion disposed between and fastened to a pair of flange portions.

In accordance with other embodiments of an intershaft seal assembly, the circumferential groove has a pair of walls. The primary sealing ring is disposed between the walls and at least one wall has at least one hydrodynamic groove.

In some preferred embodiments, the intershaft seal assembly is disposed between a rotatable runner and an otherwise non-rotatable frame. The fixed frame may be a support structure and/or other fixed or minimally-movable component(s) within an engine. A primary sealing ring of the seal assembly circumferentially seals an inner diameter surface along the runner. The primary sealing ring is disposed within a circumferential groove about an outer diameter surface of a translatable carrier of the seal assembly. The primary sealing ring contacts and rotates with the runner. Secondary sealing rings are disposed between the translatable carrier and the frame. The secondary sealing rings permit the translatable carrier to axially translate with respect to the frame. Rotational movement between the secondary sealing rings and the frame is avoided thereby limiting wear. The secondary sealing rings also seal between the translatable carrier and the frame so as to prevent a pathway for gas originating within the higher-pressure side from entering the lower-pressure side. The translatable carrier may include slots separately disposed about an equal number of tabs extending from the frame. The tab and slot arrangements permit the carrier to axially translate within a predetermined range. Some embodiments may include more than one primary sealing ring 23.

In other preferred embodiments, the intershaft seal assembly is disposed between an outer shaft and an inner shaft. The shafts may be arranged so as to be either co-rotatable or counter-rotatable. A primary sealing ring of the seal assembly circumferentially seals an inner diameter surface of the outer shaft. The primary sealing ring is disposed within a circumferential groove about an outer diameter surface of a translatable carrier of the seal assembly. The primary sealing ring contacts and rotates with the outer shaft. Secondary sealing rings are disposed between the translatable carrier and the inner shaft. The secondary sealing rings permit the translatable carrier to translate with respect to the inner shaft. Rotational movement between the secondary sealing rings and the inner shaft is avoided thereby limiting wear. The secondary sealing rings also seal between the translatable carrier and the inner shaft so as to prevent a gas originating within the higher-pressure side from entering the lower-pressure side. The translatable carrier may include slots disposed about an equal number of tabs extending from the inner shaft. The tab and slot arrangement permits the carrier to translate within a predetermined range. In some other embodiments, each secondary sealing ring may be disposed within a groove along a sleeve secured to the inner shaft. In other embodiments, the inner shaft may include a shaft portion and a sleeve portion with one or more tertiary sealing rings therebetween. Some embodiments may include more than one primary sealing ring 23.

The translatable carrier includes a plurality of channels. First channels permit a gas from the lower-pressure side to fill a lower-pressure chamber. Second channels permit a gas from the higher-pressure side to fill a higher-pressure chamber. The higher-pressure gas and the lower-pressure gas separately apply axial forces onto the sealing ring and the carrier.

The gas at the lower-pressure side applies an axial force onto each of the primary sealing ring(s) and the translatable carrier in the direction of the higher-pressure side. A portion of the lower-pressure gas passes into and through the first channels. The gas exits the first channels so as to enter a lower-pressure chamber adjacent to the higher-pressure side. The translatable carrier and the frame or the inner shaft cooperate to form the lower-pressure chamber at least in part between the translatable carrier and the frame or the inner shaft. The gas within the lower-pressure chamber applies an axial force onto the translatable carrier in the direction of the lower-pressure side.

The gas at the higher-pressure side applies an axial force onto each of the primary sealing ring(s) and the translatable carrier in the direction of the lower-pressure side. A portion of the higher-pressure gas passes into and through the second channels. The translatable carrier and the frame or the inner shaft cooperate to form the higher-pressure chamber at least in part between the translatable carrier and the frame or the inner shaft. The gas exits the second channels so as to enter a higher-pressure chamber at the lower-pressure side. The gas within the higher-pressure chamber applies an axial force onto the translatable carrier in the direction of the higher-pressure side.

In some embodiments, the opposed axial forces offset one another so as to balance the translatable carrier between the lower-pressure side and the higher-pressure side. The axial pressure force ($F_1$) acting on the translatable carrier at the lower-pressure side is balanced with respect to the axial pressure force ($F_2$) acting on the translatable carrier at the lower-pressure chamber. The axial pressure force ($F_3$) acting on the translatable carrier at the higher-pressure side is balanced with respect to the axial pressure force ($F_4$) acting on the translatable carrier from the higher-pressure chamber.

In other embodiments, the sum of axial pressure forces ($F_2$, $F_3$) at the upstream end and the sum of axial pressure forces ($F_1$, $F_4$) at the downstream end are equal or approximately equal so as to balance the translatable carrier between the lower-pressure side and the higher-pressure side.

Some translations by or between the runner/frame or the outer/inner shafts may be sufficient so as to cause a face of the primary sealing ring to come into contact with a wall within a groove of the translatable carrier. If the translatable carrier is not movable as in FIG. 1, then the face is pushed into contact with the wall so that the maximum applied force therebetween is approximately equal to the translation-resistance force ($F_{TR}$) between the sealing surface of the primary sealing ring and the inner diameter surface of an outer shaft in some designs or a runner in other designs. However, when the translatable carrier is movable as provided for by the disclosure, the maximum applied force between the face and the wall is the total translation-resistance force ($F_{TTR}$) which is approximately equal to the sum of the translation-resistance force(s) ($F_{TR1}+F_{TR2}+F_{TR3}+\ldots$) between the translatable carrier and the secondary sealing ring(s). Face wear to the primary sealing and heating of the primary sealing ring are less when the total translation-resistance force ($F_{TTR}$) is less than the translation-resistance force ($F_{TR}$).

Advantages of the disclosure are reduced face wear along the primary sealing ring(s) and reduced heating of the primary sealing ring(s). In one aspect, the translatable carrier is pressure balanced so as to minimize contact with the primary sealing ring as it rotates within a groove about the translatable carrier. In another aspect, the translatable carrier is slidable so as to permit the translatable carrier to move when the primary sealing ring is moved into contact with the translatable carrier. In yet another aspect, the wear/heating force at contact between a face of the primary sealing ring and a wall of the translatable carrier is reduced because the total force required to slide the translatable carrier with respect to the inner structure is less than the total force required to slide the primary sealing ring with respect to the rotatable outer structure.

The above and other objectives, features, and advantages of the present disclosure will become better understood from the following description, appended claims, and accompanying drawings, in which like reference numerals designate the same or similar elements.

BRIEF DESCRIPTION OF THE DRAWINGS

Additional aspects, features, and advantages of the disclosure will be understood and will become more readily apparent when the disclosure is considered in light of the following description made in conjunction with the accompanying drawings.

DETAILED DESCRIPTION

Figure 1:
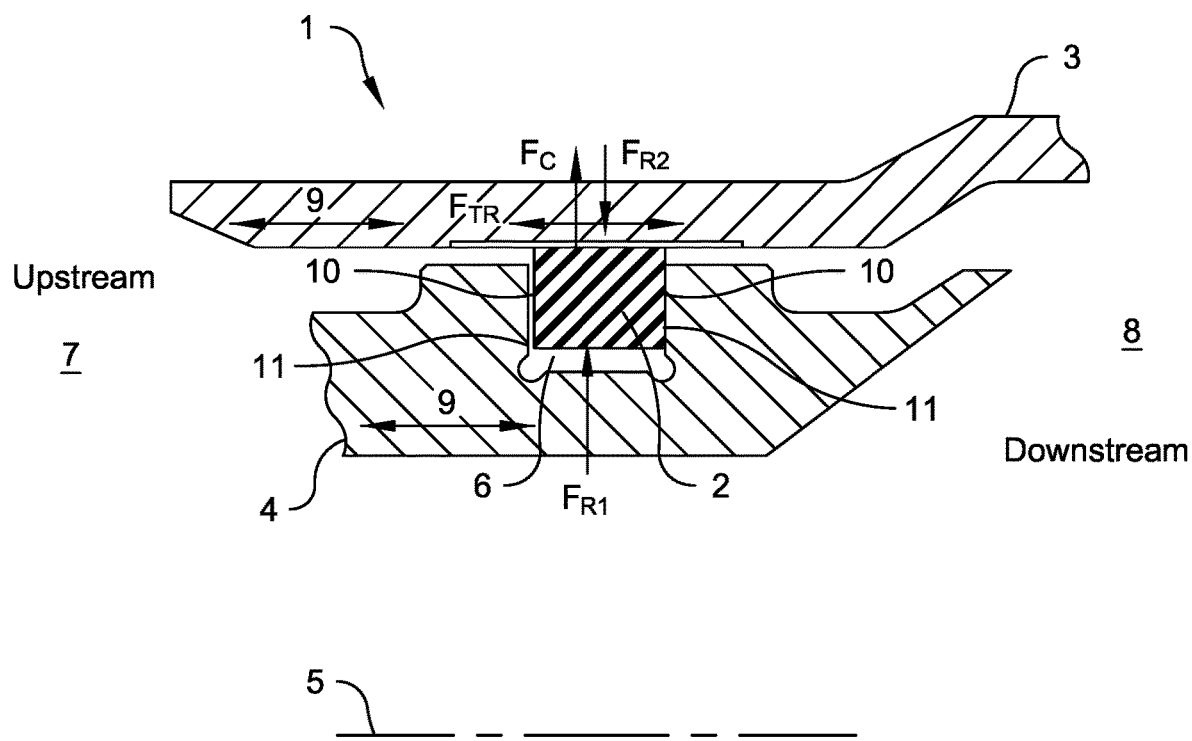
FIG. 1 is a cross-sectional view illustrating an intershaft assembly from the related art.

Reference will now be made in detail to several embodiments of the disclosure that are illustrated in the accompanying drawings. Wherever possible, same or similar reference numerals may be used in the drawings and the description to refer to the same or like parts.

While features of various embodiments are separately described herein, it is understood that such features may be combinable to form other additional embodiments.

One or more components described herein may be manufactured via methods, processes, and techniques understood in the art, including, but not limited to, machining, molding, forming, and three-dimensional printing.

The drawing figures are not necessarily drawn to scale, but instead are drawn to provide a better understanding of the components thereof, and are not intended to be limiting in scope, but to provide exemplary illustrations.

Figure 2:
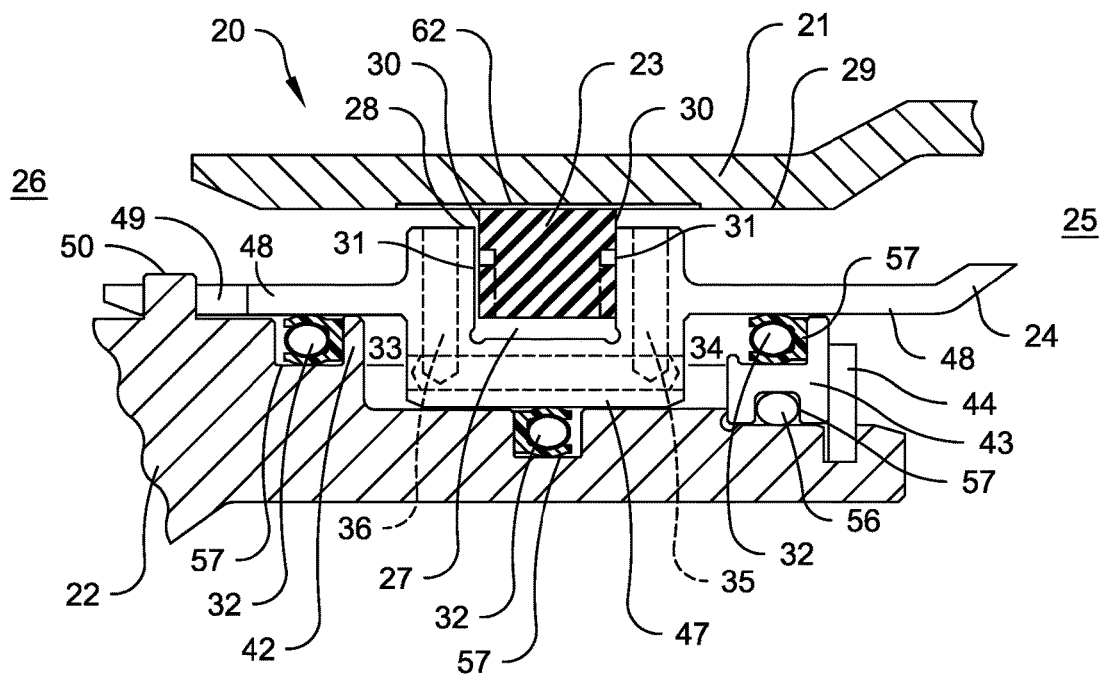
FIG. 2 is a cross-sectional view illustrating an intershaft seal assembly between a rotatable outer structure and a non-rotatable inner structure wherein a primary sealing ring is disposed within a groove about a translatable carrier, the translatable carrier slidingly contacts secondary sealing rings, and a gas from each of a lower-pressure side and a higher-pressure side separately pass through channels of the translatable carrier so that axial pressure forces about the translatable carrier are opposed and balanced in accordance with an embodiment of the invention.

Referring now to FIG. 2, the intershaft seal assembly 20 is sealingly positioned between a rotatable outer structure 21 and an inner structure 22 within a turbine engine. The intershaft seal assembly 20 is configured to prevent and/or limit mixing of gases and oil originating from a lower-pressure side 25 at one end of the intershaft seal assembly 20 and a higher-pressure side 26 at another end of the intershaft seal assembly 20. In preferred embodiments, gas(es) from the higher-pressure side 26 leaks across the primary seal ring 23 thereby preventing oil from exiting the lower-pressure side 25. In its simplest form, the intershaft seal assembly 20 includes a primary sealing ring 23, a translatable carrier 24 with at least one first channel 35 and at least one second channel 36, at least one secondary sealing ring 32, a lower-pressure chamber 33, and a higher-pressure chamber 34.

Referring again to FIG. 2, the primary sealing ring 23 is a ring-shaped sealing element adaptable for placement within a circumferential groove 27 along an outer diameter surface 28 of the translatable carrier 24. In preferred embodiments, the primary sealing ring 23 has a pair of faces 30. Each face 30 is disposed adjacent to a wall 31 of the circumferential groove 27. A face 30 and a wall 31 may initially contact adjacent to the lower-pressure side 25 depending on the pressure differential between the higher-pressure side 26 and the lower-pressure side 25. A face 30 and a wall 31 may contact adjacent to either the lower-pressure side 25 or the higher-pressure side 26 depending on pressure, heating, translation, or other condition(s) and/or response(s) within or by a turbine engine. The primary sealing ring 23 may include one or more gaps which permit outward radial expansion as the primary sealing ring 23 is rotated by and with the rotatable outer structure 21. In one non-limiting example, the primary sealing ring 23 is a piston-type ring with a narrow radial thru gap. The primary sealing ring 23 pushes against an inner diameter surface 29 of the rotatable outer structure 21 as the primary sealing ring 23 rotates.

Figure 3:
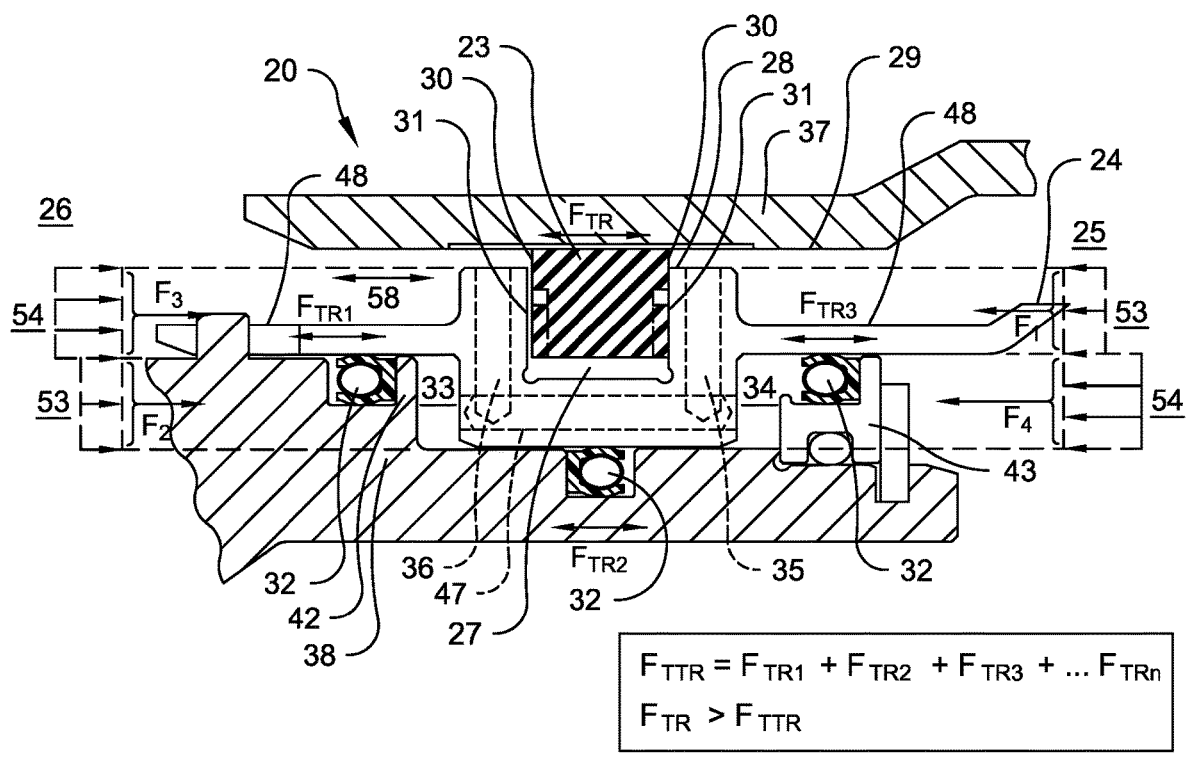
FIG. 3 is a cross-sectional view illustrating the intershaft seal assembly of FIG. 2 between a rotatable runner and a non-rotatable frame wherein an axial pressure force is communicated by a portion of a higher-pressure gas onto the translatable carrier adjacent to the higher-pressure side, an axial pressure force is communicated by another portion of a higher-pressure gas onto the translatable carrier adjacent to the lower-pressure side, an axial pressure force is communicated by a portion of a lower-pressure gas onto the translatable carrier adjacent to the lower-pressure side, an axial pressure force is communicated by another portion of a lower-pressure gas onto the translatable carrier adjacent to the higher-pressure side, and the translatable carrier contacts secondary sealing rings which in combination are less resistive to sliding than the primary sealing ring along the outer structure in accordance with an embodiment of the invention.
Figure 7A:
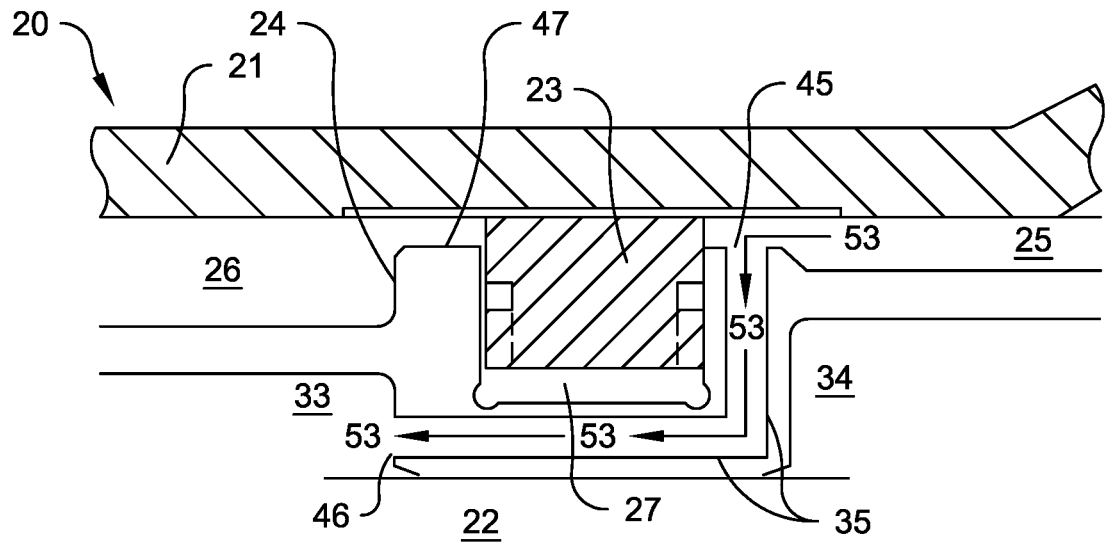
FIG. 7a is one cross-sectional view illustrating an intershaft seal assembly including a primary sealing ring disposed within a circumferential groove about a translatable carrier between a rotatable outer structure and an inner structure wherein a first channel traverses the translatable carrier so as to be communicable at an inlet end with a lower-pressure side and at an outlet end with a lower-pressure chamber in accordance with an embodiment of the invention.
Figure 7B:
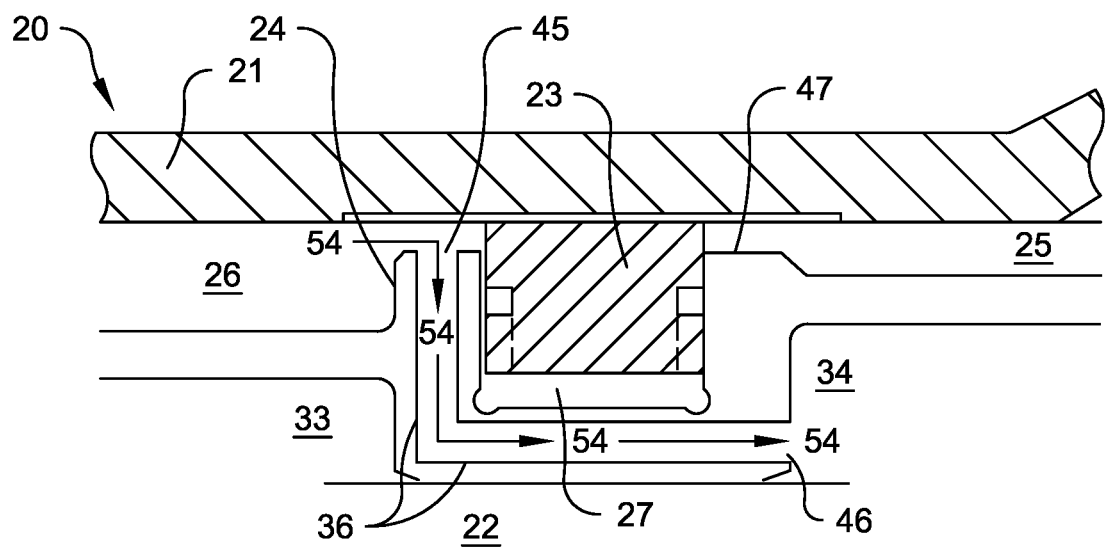
FIG. 7b is another cross-sectional view illustrating an intershaft seal assembly including a primary sealing ring disposed within a circumferential groove about a translatable carrier between a rotatable outer structure and an inner structure wherein a second channel traverses the translatable carrier so as to be communicable at an inlet end with a higher-pressure side and at an outlet end with a higher-pressure chamber in accordance with an embodiment of the invention.
Figure 8:
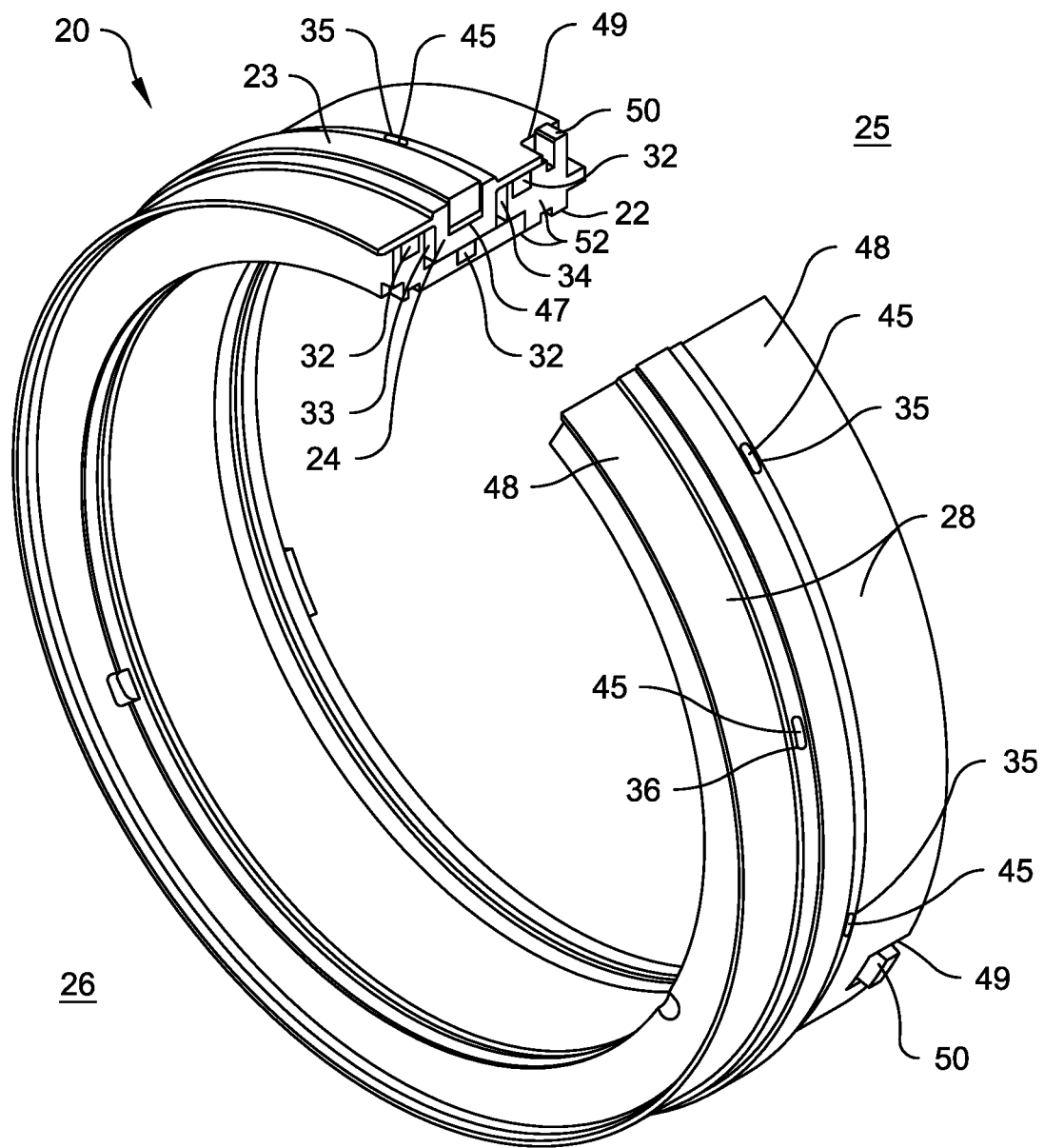
FIG. 8 is a perspective view with cross-section illustrating an intershaft seal assembly wherein inlet ends of the first channels are separately spaced, inlet ends of the second channels are separately spaced, and inlet ends of the first channels and inlet ends of the second channels are offset about a primary sealing ring in accordance with an embodiment of the invention.

Referring again to FIG. 2, the translatable carrier 24 is disposed about the inner structure 22. The inner structure 22 is shaped and sized so as to permit the translatable carrier 24 to encircle a portion of the axial length of the inner structure 22. The translatable carrier 24 is shaped and sized so as to minimize direct contact with the rotatable outer structure 21, so as to indirectly contact the inner structure 22 via one or more secondary sealing rings 32, so as to support the primary sealing ring 23, and so as to permit translation by the translatable carrier 24 in the axial direction with respect to the rotatable outer structure 21 and the inner structure 22. In preferred embodiments, the translatable carrier 24 includes a center portion 47 disposed between and connected to a pair of flange portions 48. The center portion 47 includes the circumferential groove 27 which extends into the center portion 47 from the outer diameter surface 28. The flange portions 48 axially extend from the center portion 47 to form either a radially symmetric arrangement, as illustrated in FIGS. 2 and 3 whereby the flange portions 48 are at the same or similar radial positions, or a radially asymmetric arrangement, as illustrated in FIGS. 7a and 7b whereby the flange portions 48 are at different radial positions. An advantage of a symmetric arrangement is that the same radial dimensions may be used for the secondary sealing ring 32 contacting each flange portion 48. One flange portion 48 may include two or more slots 49 positioned to engage two or more tabs 50 extending outward from the inner structure 22. The arrangement between the slots 49 and the tabs 50 may limit the axial translation of the translatable carrier 24 with respect to the inner structure 22 and may also prevent relative rotation between the translatable carrier 24 and the inner structure 22. The slot 49 and tab 50 combinations may be separately disposed about the intershaft seal assembly 20, as illustrated in FIG. 8.

Referring again to FIG. 2, the translatable carrier 24 may be secured to the inner structure 22 between a shoulder 42 and an end ring 43. In preferred embodiments, the axial distance between the shoulder 42 and the end ring 43 should be sufficient to permit relative translation between the tab 50 and the slot 49 over the axial dimension of the slot 49 so as to permit the range of translation required by the translatable carrier 24. The shoulder 42 extends radially outward from the inner structure 22. The end ring 43 may be secured to the inner structure 22 via a retaining ring 44 or other means understood in the art. In preferred embodiments, the end ring 43 with or without the retaining ring 44 is understood to be part of the inner structure 22. The end ring 43 and the retaining ring 44 are removably securable to the inner structure 22 to facilitate assembly and disassembly of the intershaft seal assembly 20.

Referring again to FIG. 2, the translatable carrier 24 is arranged about the inner structure 22 to define a generally annular-shaped, lower-pressure chamber 33. The lower-pressure chamber 33 is positioned between the translatable carrier 24 and the inner structure 22 adjacent to the higher-pressure side 26. One or more first channels 35 traverse the translatable carrier 24 to define passageways permitting gas originating within the lower-pressure side 25 to enter the lower-pressure chamber 33. In preferred embodiments, each first channel 35 passes through the translatable carrier 24 adjacent to and separate from the circumferential groove 27.

Referring again to FIG. 2, the translatable carrier 24 is also arranged about the inner structure 22 to define a generally annular-shaped, higher-pressure chamber 34. The higher-pressure chamber 34 is positioned between the translatable carrier 24 and the inner structure 22 adjacent to the lower-pressure side 25. One or more second channels 36 traverse the translatable carrier 24 to define passageways permitting gas originating within the higher-pressure side 26 to enter the higher-pressure chamber 34. In preferred embodiments, each second channel 36 passes through the translatable carrier 24 adjacent to and separate from the circumferential groove 27.

Referring again to FIG. 2, at least one secondary sealing ring 32 is positioned between the translatable carrier 24 and the inner structure 22. Each secondary sealing ring 32 contacts and seals adjacent surfaces of the translatable carrier 24 and the inner structure 22 so as to prevent a pathway for the uncontrolled flow or leakage of gases between the higher-pressure side 26 and the lower-pressure side 25. Each secondary sealing ring 32 should permit slidable contact with the translatable carrier 24. The secondary sealing ring(s) 32 may be a suitable device known within the art, one non-limiting example being a spring-energized sealing ring. One specific example of a spring-energized sealing ring is the OmniSeal® APS sold by Saint-Gobain Performance Plastics. The total resistance to sliding translation by the translatable carrier 24 over all secondary sealing rings 32 should be less than the resistance to sliding translation at contact between the primary sealing ring 23 and the inner diameter surface 29 of the rotatable outer structure 21.

Referring again to FIG. 2, a secondary sealing ring 32 may be positioned at one or more locations between the translatable carrier 24 and the inner structure 22. For example, one secondary sealing ring 32 may be disposed within a groove 57 along the inner structure 22 so as to sealingly contact the flange portion 48 at the higher-pressure side 26. In another example, one secondary sealing ring 32 may be disposed within a groove 57 along the inner structure 22 so as to sealingly contact the center portion 47 between the higher-pressure chamber 34 and the lower-pressure chamber 33. In yet another example, one secondary sealing ring 32 may be disposed within a groove 57 along the end ring 43 so as to sealingly contact the flange portion 48 at the lower-pressure side 25. In preferred embodiments, the secondary sealing rings 32 are positioned in a paired arrangement to prevent leakage from each of and between the higher-pressure chamber 34 and the lower-pressure chamber 33. For example, one secondary sealing ring 32 may be positioned at one side of the lower-pressure chamber 33 between one flange portion 48 and the inner structure 22 and another secondary sealing ring 32 may be positioned at another side of the lower-pressure chamber 33 between the center portion 47 and the inner structure 22. In another example, one secondary sealing ring 32 may be positioned at one side of the higher-pressure chamber 34 between one flange portion 48 and the inner structure 22 and another secondary sealing ring 32 may be positioned at another side of the higher-pressure chamber 34 between the center portion 47 and the inner structure 22. One secondary sealing ring 32 in sealing contact with the center portion 47 may be sufficient for purposes of both paired arrangements, as illustrated in FIG. 2.

Referring again to FIG. 2, it might be advantageous to include one or more additional sealing-type rings so as to prevent pathways for the uncontrolled flow or leakage of gases from the lower-pressure side 25 and the higher-pressure side 26. For example, a tertiary sealing ring 56 may be positioned within a groove 57 along the end ring 43 so as to sealingly contact the inner structure 22. The end ring 43 with the secondary sealing ring 32 and/or the tertiary sealing ring 56 may cooperate with the translatable carrier 24 and the inner structure 22 to enclose the higher-pressure chamber 34. Other locations are possible for the tertiary sealing rings 56 as may be required. Referring now to FIG. 3, the rotatable outer structure 21 and the inner structure 22 of the intershaft seal assembly 20 in FIG. 2 may be a runner 37 and a non-rotatable frame 38, respectively. The intershaft seal assembly 20 is positioned so that a lower-pressure gas 53 and a higher-pressure gas 54 contact components thereof, thereby exerting axial and radial forces thereon. The lower-pressure gas 53 at the lower-pressure side 25 and the higher-pressure gas 54 at the higher-pressure side 26 separately contact the primary sealing ring 23. Typically, the axial pressure forces applied onto the primary sealing ring 23 are not considered when balancing the translatable carrier 24. However, these forces may be considered in some applications or designs so that the higher-pressure gas 54 responsible for the upstream axial pressure force ($F_3$) extends to the inner diameter surface 29 and so that the lower-pressure gas 53 responsible for the downstream axial pressure force ($F_1$) also extends to the inner diameter surface 29. By way of several non-limiting examples, it may be appropriate to consider the axial component along a face 30 of the primary sealing ring 23 between the inner diameter surface 29 and the outer diameter surface 28 when the outer shaft speed is low and the pressure differential is high or when either a wall 31 or a face 30 includes one or more hydrodynamic grooves 41 (see non-limiting example in FIG. 6b) which produce a thin film with a stiffness greater than the contact force. The lower-pressure gas 53 at the lower-pressure side 25 contacts the flange portion 48 so as to communicate an axial pressure force ($F_1$) in the direction of the higher-pressure side 26. The lower-pressure gas 53 within the lower-pressure chamber 33 contacts the center portion 47 so as to communicate an axial pressure force ($F_2$) in the direction of the lower-pressure side 25. The higher-pressure gas 54 at the higher-pressure side 26 contacts the flange portion 48 so as to communicate an axial pressure force ($F_3$) in the direction of the lower-pressure side 25. The higher-pressure gas 54 within the higher-pressure chamber 34 contacts the center portion 47 so as to communicate an axial pressure force ($F_4$) in the direction of the higher-pressure side 26. The magnitude of each axial pressure force ($F_1$, $F_4$) is determined at least in part by the radial height of the higher-pressure chamber 34, the radial location of the flange portion 48 extending from the center portion 47 at the lower-pressure side 25, and the radial height from the inner diameter of the flange portion 48 to the outer diameter 28 of the center portion 47 at the lower pressure side 25. The magnitude of each axial pressure force ($F_2$, $F_3$) is determined at least in part by the radial height of the lower-pressure chamber 33, the radial location of the flange portion 48 extending from the center portion 47 at the higher-pressure side 26, and the radial height from the inner diameter of the flange portion 48 to the outer diameter surface 28 of the center portion 47 at the higher pressure side 26.

Referring again to FIG. 3, the translatable carrier 24 moves with the primary sealing ring 23 during translation and can be anywhere between the shoulder 42 and the end ring 43. In preferred embodiments, the lower-pressure chamber 33 and the higher-pressure chamber 34 are axially sized to permit the maximum translation required between the runner 37 and the non-rotatable frame 38. The position of the translatable carrier 24 is maintained by balancing the axial pressure forces ($F_1$, $F_4$) at the lower-pressure side 25 to the axial pressure forces ($F_2$, $F_3$) at the higher-pressure side 26. In some embodiments, the axial pressure forces ($F_1$, $F_2$) are equal or nearly equal and the axial pressure forces ($F_3$, $F_4$) are also equal or nearly equal so that the net pressure forces are zero or nearly zero. In other embodiments, the total of the axial pressure forces ($F_1$, $F_4$) is equal or nearly equal to the total of the axial pressure forces ($F_2$, $F_3$) so that the net pressure force is zero or nearly zero. Regardless, it is understood that the axial pressure forces ($F_1$, $F_2$, $F_3$, $F_4$) should balance out so as to maintain an axial clearance at each face 30 of the primary sealing ring 23 within the circumferential groove 27 during periods when the translatable carrier 24 does not translate. The axial clearance avoids contact between a face 30 and a wall 31 thereby avoiding frictional wear and heating of the primary sealing ring 23. If contact occurs between a face 30 and a wall 31, the runout and/or the waviness of the wall 31 reestablishes an axial clearance usually within one revolution. The axial clearance may be reestablished by a thin film formed by a hydrodynamic groove(s) 41 (see non-limiting example in FIG. 6b) along either a face 30 or a wall 31.

Referring again to FIG. 3, the primary sealing ring 23 pushes against the inner diameter surface 29 so as to be movable with the runner 37 and the translatable carrier 24 is movably secured to the non-rotatable frame 38 at least in part by the secondary sealing rings 32. Some axial translations 58 by the primary sealing ring 23 via the runner 37 may cause a face 30 of the primary sealing ring 23 to contact a wall 31 of the circumferential groove 27. Although axial translations 58 via the non-rotatable frame 38 are less likely, conditions within a turbine engine may from time-to-time cause localized expansion, contraction, or movement within or by the non-rotatable frame 38. These other axial translations 58 by the translatable carrier 24 via the non-rotatable frame 38 may also cause a face 30 of the primary sealing ring 23 to contact a wall 31 of the circumferential groove 27. In order to avoid excessive frictional wear and heating to a face 30 by a wall 31, the total translation-resistance force ($F_{TTR}$) imposed by the sum of the translation-resistance force ($F_{TR1}$, $F_{TR2}$, $F_{TR3}$) at each contact between a secondary sealing ring 32 and the translatable carrier 24 should be less than the translation-resistance force ($F_{TR}$) at contact between the sealing surface the primary sealing ring 23 and the inner diameter surface 29 of the runner 37. An axial translation 58 by the translatable carrier 24 relative to the non-rotatable frame 38 (or the inner structure 22) before the onset of an axial translation 58 by the primary sealing ring 23 relative to the runner 37 (or the rotatable outer structure 21) ensures that the contact force responsible for frictional wear and heating along the interface between a face 30 and a wall 31 is less than the translation-resistance force ($F_{TR}$).

Figure 4:
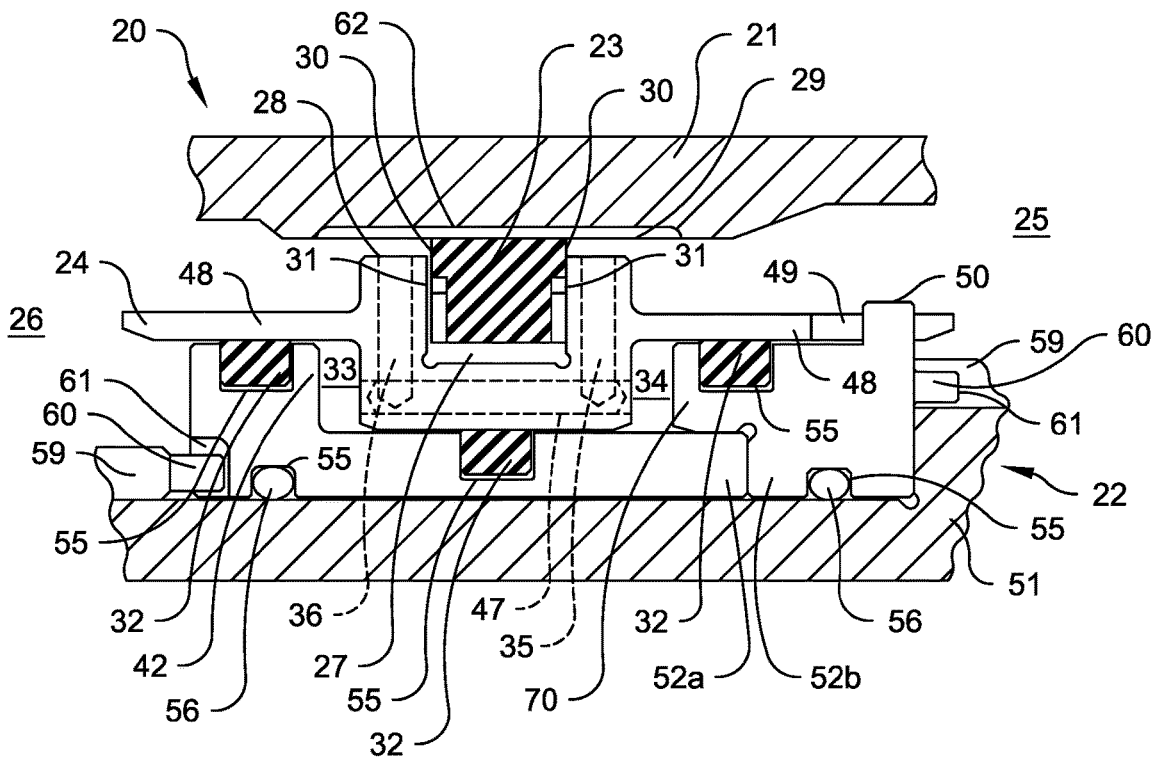
FIG. 4 is a cross-sectional view illustrating an intershaft seal assembly between a rotatable outer structure and a rotatable inner structure wherein a primary sealing ring is disposed within a groove about a translatable carrier, the translatable carrier slidingly contacts secondary sealing rings, and a gas from each of a lower-pressure side and a higher-pressure side separately pass through channels of the translatable carrier so that axial pressure forces about the translatable carrier are opposed and balanced in accordance with an embodiment of the invention.

Referring now to FIGS. 4 and 8, the intershaft seal assembly 20 is sealingly positioned between a rotatable outer structure 21 and an inner structure 22 within a turbine engine. The intershaft seal assembly 20 is configured to prevent and/or limit mixing of gases and oil originating from a lower-pressure side 25 at one end of the intershaft seal assembly 20 and a higher-pressure side 26 at another end of the intershaft seal assembly 20. Gas(es) from the higher-pressure side 26 leaks across the primary sealing ring 23 thereby preventing oil from exiting the lower-pressure side 25. In its simplest form, the intershaft seal assembly 20 includes a primary sealing ring 23, a translatable carrier 24 with at least one first channel 35 and at least one second channel 36, at least one secondary sealing ring 32, a lower-pressure chamber 33, and a higher-pressure chamber 34. The inner structure 22 may further include a sleeve portion 52 disposed about, contacting, and rotatable with a shaft portion 51. The sleeve portion 52 may be constructed of one or more sleeve portions 52a, 52b.

Referring again to FIG. 4, the primary sealing ring 23 is a ring-shaped sealing element adaptable for placement within a circumferential groove 27 along an outer diameter surface 28 of the translatable carrier 24. In preferred embodiments, the primary sealing ring 23 has a pair of faces 30. Each face 30 is disposed adjacent to a wall 31 of the circumferential groove 27. A face 30 and a wall 31 may initially contact adjacent to the lower-pressure side 25 depending on the pressure differential between the higher-pressure side 26 and the lower-pressure side 25. A face 30 and a wall 31 may contact adjacent to either the lower-pressure side 25 or the higher-pressure side 26 depending on pressure, heating, translations, or other condition(s) and/or response(s) within or by a turbine engine. The primary sealing ring 23 may include one or more gaps which permit the primary sealing ring 23 to radially expand outward as the primary sealing ring 23 is rotated by and with the rotatable outer structure 21. In one non-limiting example, the primary sealing ring 23 is a piston-type ring with a narrow radial thru gap. The primary sealing ring 23 pushes against an inner diameter surface 29 of the rotatable outer structure 21 as the primary sealing ring 23 rotates.

Figure 5:
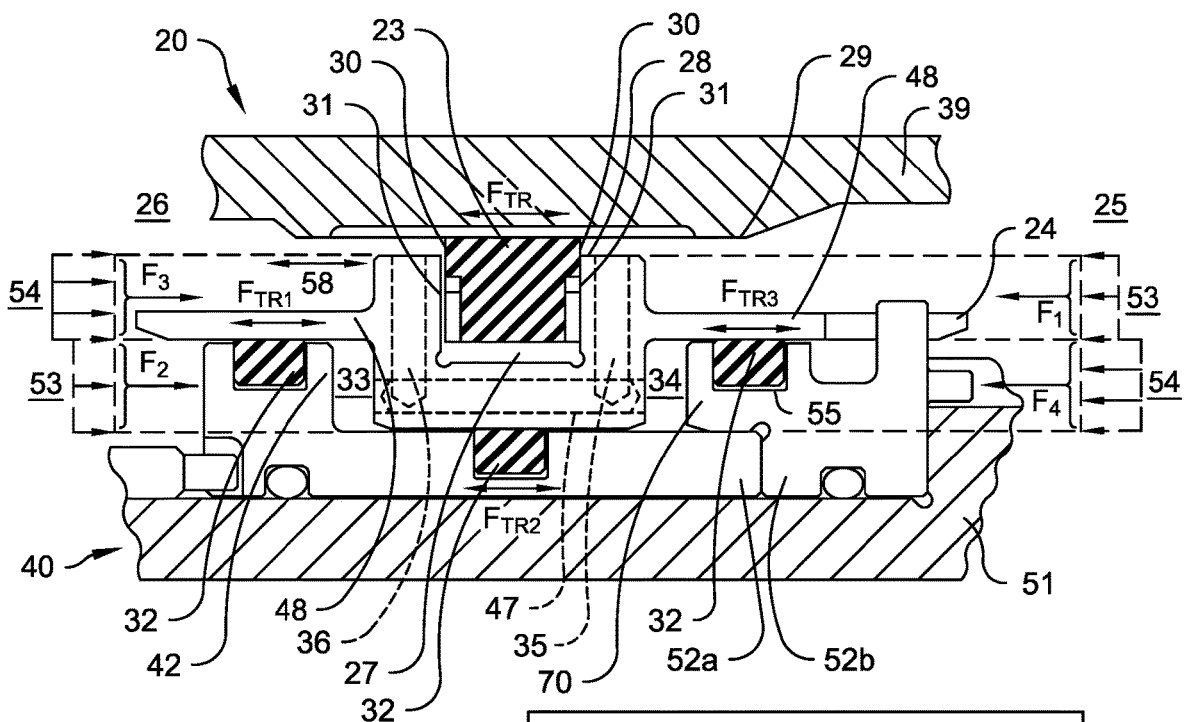
FIG. 5 is a cross-sectional view illustrating the intershaft seal assembly of FIG. 4 between a rotatable outer shaft and a rotatable inner shaft wherein an axial pressure force is communicated by a portion of a higher-pressure gas onto the translatable carrier adjacent to the higher-pressure side, an axial pressure force is communicated by another portion of a higher-pressure gas onto the translatable carrier adjacent to the lower-pressure side, an axial pressure force is communicated by a portion of a lower-pressure gas onto the translatable carrier adjacent to the lower-pressure side, an axial pressure force is communicated by another portion of a lower-pressure gas onto the translatable carrier adjacent to the higher-pressure side, and the translatable carrier contacts secondary sealing rings which in combination are less resistive to sliding than the primary sealing ring along the outer structure in accordance with an embodiment of the invention.

Referring again to FIG. 4, the translatable carrier 24 is disposed about and rotates with the inner structure 22. The inner structure 22 is shaped and sized so as to permit the translatable carrier 24 to encircle a portion of the axial length of the inner structure 22. The translatable carrier 24 is shaped and sized so as to minimize direct contact with the rotatable outer structure 21, so as to indirectly contact the inner structure 22 via one or more secondary sealing rings 32, so as to support the primary sealing ring 23, and so as to permit translation by the translatable carrier 24 in the axial direction with respect to the rotatable outer structure 21 and the inner structure 22. In preferred embodiments, the translatable carrier 24 includes a center portion 47 disposed between and connected to a pair of flange portions 48. The center portion 47 includes the circumferential groove 27 which extends into the center portion 47 from the outer diameter surface 28. The flange portions 48 axially extend outward from the center portion 47 to form either a radially symmetric arrangement, as illustrated in FIGS. 4 and 5 whereby the flange portions 48 are at the same or similar radial positions, or a radially asymmetric arrangement, as illustrated in FIGS. 7a and 7b whereby the flange portions 48 are at different radial positions. An advantage of a symmetric arrangement is that the same radial dimensions may be used for the secondary sealing ring 32 contacting each flange portion 48. One flange portion 48 may include two or more slots 49 positioned to engage two or more tabs 50 extending outward from the sleeve portion 52. The arrangement between the slots 49 and the tabs 50 may limit the axial translation of the translatable carrier 24 with respect to the inner structure 22 and may also prevent relative rotation between the translatable carrier 24 and the inner structure 22. The slot 49 and tab 50 combinations may be separately disposed about the intershaft seal assembly 20, as illustrated in FIG. 8. Referring again to FIG. 4, the translatable carrier 24 may be secured to the inner structure 22 between a shoulder 42 along one sleeve portion 52*a* and a shoulder 70 along another sleeve portion 52*b*. In preferred embodiments, the axial distance between the shoulders 42, 70 should be sufficient to permit relative translation between the tab 50 and the slot 49 over the axial dimension of the slot 49 so as to permit the range of translation required by the translatable carrier 24. The sleeve portion 52 may be secured to the inner structure 22 via a pair of retainers 59 separately disposed at opposite ends of the sleeve portion 52*a*, 52*b*. One retainer 59 may be secured to the shaft portion 51 so that one or more pins 60 along the retainer 59 engage a like number of slots 61 within the sleeve portion 52*a*. Another retainer 59 may be secured to or a part of the shaft portion 51 whereby one or more pins 60 extending from the sleeve portion 52*b* engage a like number of slots 61 within retainer 59. One or both retainers 59 may be removably attached to the shaft portion 51 to facilitate assembly and disassembly of the intershaft seal assembly 20. In preferred embodiments, the sleeve portion 52*a*, 52*b* with or without the shaft portion 51 is understood to be part of the inner structure 22.

Referring again to FIG. 4, the translatable carrier 24 is arranged about the inner structure 22 to define a generally annular-shaped, lower-pressure chamber 33. The lower-pressure chamber 33 is positioned between the translatable carrier 24 and the inner structure 22 adjacent to the higher-pressure side 26. One or more first channels 35 traverse the translatable carrier 24 to define passageways permitting gas originating within the lower-pressure side 25 to enter the lower-pressure chamber 33. In preferred embodiments, each first channel 35 passes through the translatable carrier 24 adjacent to and separate from the circumferential groove 27.

Referring again to FIG. 4, the translatable carrier 24 is also arranged about the inner structure 22 to define a generally annular-shaped, higher-pressure chamber 34. The higher-pressure chamber 34 is positioned between the translatable carrier 24 and the inner structure 22 adjacent to the lower-pressure side 25. One or more second channels 36 traverse the translatable carrier 24 to define passageways permitting gas originating within the higher-pressure side 26 to enter the higher-pressure chamber 34. In preferred embodiments, each second channel 36 passes through the translatable carrier 24 adjacent to and separate from the circumferential groove 27.

Referring again to FIG. 4, at least one secondary sealing ring 32 is positioned between the translatable carrier 24 and the inner structure 22. Each secondary sealing ring 32 contacts and seals adjacent surfaces of the translatable carrier 24 and the sleeve portion 52 so as to prevent a pathway for the uncontrolled flow or leakage of gases between the higher-pressure side 26 and the lower-pressure side 25. Each secondary sealing ring 32 should permit slidable contact with the translatable carrier 24. The secondary sealing ring(s) 32 may be a suitable device known within the art, one non-limiting example being a piston-type ring with a narrow thru gap. The total resistance to sliding translation by the translatable carrier 24 over all secondary sealing rings 32 should be less than the resistance to sliding translation at contact between the primary sealing ring 23 and the inner diameter surface 29 of the rotatable outer structure 21.

Referring again to FIG. 4, a secondary sealing ring 32 may be positioned at one or more locations between the translatable carrier 24 and the sleeve portion 52. For example, one secondary sealing ring 32 may be disposed within a groove 55 along the sleeve portion 52*a* so as to sealingly contact the flange portion 48 at the higher-pressure side 26. In another example, one secondary sealing ring 32 may be disposed within a groove 55 along the sleeve portion 52*a* so as to sealingly contact the center portion 47 between the lower-pressure chamber 33 and the higher-pressure chamber 34. In yet another example, one secondary sealing ring 32 may be disposed within a groove 55 along the sleeve portion 52*b* so as to sealingly contact the flange portion 48 at the lower-pressure side 25. In preferred embodiments, the secondary sealing rings 32 are positioned in a paired arrangement to prevent leakage from each of and between the higher-pressure chamber 34 and the lower-pressure chamber 33. For example, one secondary sealing ring 32 may be positioned at one side of the lower-pressure chamber 33 between one flange portion 48 and the sleeve portion 52*a* and another secondary sealing ring 32 may be positioned at another side of the lower-pressure chamber 33 between the center portion 47 and the sleeve portion 52*a*. In another example, one secondary sealing ring 32 may be positioned at one side of the higher-pressure chamber 34 between one flange portion 48 and the sleeve portion 52*b* and another secondary sealing ring 32 may be positioned at another side of the higher-pressure chamber 34 between the center portion 47 and the sleeve portion 52*a*. One secondary sealing ring 32 in sealing contact with the center portion 47 may be sufficient for purposes of both paired arrangements, as illustrated in FIG. 4.

Referring again to FIG. 4, it might be advantageous to include one or more additional sealing-type rings so as to prevent pathways for the uncontrolled flow or leakage of gases from the lower-pressure side 25 and the higher-pressure side 26. For example, a tertiary sealing ring 56 may be positioned within a groove 55 at each segment of the sleeve portion 52*a*, 52*b* so as to sealingly contact the shaft portion 51. The secondary sealing ring 32 and/or the tertiary sealing ring 56 may cooperate with the translatable carrier 24 and the sleeve portion 52 to enclose the lower-pressure chamber 33 or the higher-pressure chamber 34. Other locations are possible for tertiary sealing rings 56 as may be required. One non-limiting example of a tertiary sealing ring 56 is an O-ring.

Referring now to FIG. 5, the rotatable outer structure 21 and the inner structure 22 of the intershaft seal assembly 20 in FIG. 4 may be an outer shaft 39 and an inner shaft 40, respectively. The inner shaft 40 may further include the shaft portion 51 and the sleeve portion 52 (52*a*, 52*b*). In some embodiments, the inner shaft 40 may be counter-rotatable with respect to the outer shaft 39. In other embodiments, the inner shaft 40 may be co-rotatable with respect to the outer shaft 39. In yet other embodiments, the inner shaft 40 may not rotate.

Referring again to FIG. 5, the intershaft seal assembly 20 is positioned so that a lower-pressure gas 53 and a higher-pressure gas 54 contact components thereof, thereby exerting axial and radial forces thereon. The lower-pressure gas 53 at the lower-pressure side 25 and the higher-pressure gas 54 at the higher-pressure side 26 separately contact the primary sealing ring 23. Typically, the axial pressure forces applied onto the primary sealing ring 23 are not considered when balancing the translatable carrier 24. However, these forces may be considered in some applications or designs so that the higher-pressure gas 54 responsible for the upstream axial pressure force ($F_3$) extends to the inner diameter surface 29 and so that the lower-pressure gas 53 responsible for the downstream axial pressure force ($F_1$) also extends to the inner diameter surface 29. By way of several non-limiting examples, it may be appropriate to consider the axial component along a face 30 of the primary sealing ring 23 between the inner diameter surface 29 and the outer diameter surface 28 when the outer shaft speed is low and the pressure differential is high or when either a wall 31 or a face 30 includes one or more hydrodynamic grooves 41 (see non-limiting example in FIG. 6b) which produce a thin film with a stiffness greater than the contact force. The lower-pressure gas 53 at the lower-pressure side 25 contacts the flange portion 48 so as to communicate an axial pressure force ($F_1$) in the direction of the higher-pressure side 26. The lower-pressure gas 53 within the lower-pressure chamber 33 contacts the center portion 47 so as to communicate an axial pressure force ($F_2$) in the direction of the lower-pressure side 25. The higher-pressure gas 54 at the higher-pressure side 26 contacts the flange portion 48 so as to communicate an axial pressure force ($F_3$) in the direction of the lower-pressure side 25. The higher-pressure gas 54 within the higher-pressure chamber 34 contacts the center portion 47 so as to communicate an axial pressure force ($F_4$) in the direction of the higher-pressure side 26. The magnitude of each axial pressure force ($F_1$, $F_4$) is determined at least in part by the radial height of the higher-pressure chamber 34, the radial location of the flange portion 48 extending from the center portion 47 at the lower-pressure side 25, and the radial height from the inner diameter of the flange portion 48 to the outer diameter surface 28 of the center portion 47 at the lower pressure side 25. The magnitude of each axial pressure force ($F_2$, $F_3$) is determined at least in part by the radial height of the lower-pressure chamber 33, the radial location of the flange portion 48 extending from the center portion 47 at the higher-pressure side 26, and the radial height from the inner diameter of the flange portion 48 to the outer diameter surface 28 of the center portion 47 at the higher pressure side 26.

Referring again to FIG. 5, the translatable carrier 24 moves with the primary sealing ring 23 during translation and can be anywhere between the shoulders 42, 70. In preferred embodiments, the lower-pressure chamber 33 and the higher-pressure chamber 34 are axially sized to permit the maximum translation between the outer shaft 39 and the inner shaft 40. The position of the translatable carrier 24 is maintained by balancing the axial pressure forces ($F_1$, $F_4$) at the lower-pressure side 25 to the axial pressure forces ($F_2$, $F_3$) at the higher-pressure side 26. In some embodiments, the axial pressure forces ($F_1$, $F_2$) are equal or nearly equal and the axial pressure forces ($F_3$, $F_4$) are also equal or nearly equal so that the net pressure forces are zero or nearly zero. In other embodiments, the total of the axial pressure forces ($F_1$, $F_4$) is equal or nearly equal to the total of the axial pressure forces ($F_2$, $F_3$) so that the net pressure force is zero or nearly zero. Regardless, it is understood that the axial pressure forces ($F_1$, $F_2$, $F_3$, $F_4$) should balance out so as to maintain an axial clearance at each face 30 of the primary sealing ring 23 within the circumferential groove 27 during periods when the translatable carrier 24 does not translate. The axial clearance avoids contact between a face 30 and a wall 31 thereby avoiding frictional wear and heating of the primary sealing ring 23. If contact occurs between a face 30 and a wall 31, the runout and/or the waviness of the wall 31 reestablishes an axial clearance usually within one revolution. The axial clearance may be reestablished by a thin film formed by a hydrodynamic groove(s) 41 (see non-limiting example in FIG. 6b) along either a face 30 or a wall 31.

Referring again to FIG. 5, the primary sealing ring 23 pushes against the inner diameter surface 29 so as to be movable with the outer shaft 39 and the translatable carrier 24 is movably secured to the inner shaft 40 at least in part by the secondary sealing rings 32. Some axial translations 58 by the primary sealing ring 23 via the outer shaft 39 may cause a face 30 of the primary sealing ring 23 to contact a wall 31 of the circumferential groove 27. Other axial translations 58 by the translatable carrier 24 via the inner shaft 40 may also cause a face 30 of the primary sealing ring 23 to contact a wall 31 of the circumferential groove 27. In order to avoid excessive frictional wear and heating to a face 30 by a wall 31, the total translation-resistance force ($F_{TTR}$) imposed by the sum of the translation-resistance force ($F_{TR1}$, $F_{TR2}$, $F_{TR3}$) at each contact between a secondary sealing ring 32 and the translatable carrier 24 should be less than the translation-resistance force ($F_{TR}$) at contact between the sealing surface of the primary sealing ring 23 and the inner diameter surface 29 of the outer shaft 39. An axial translation 58 by the translatable carrier 24 relative to the inner shaft 40 (or the inner structure 22) before the onset of an axial translation 58 by the primary sealing ring 23 relative to the outer shaft 39 (or the rotatable outer structure 21) ensures that the contact force responsible for frictional wear and heating at the interface between a face 30 and a wall 31 is less than the translation-resistance force ($F_{TR}$).

Figure 6A:
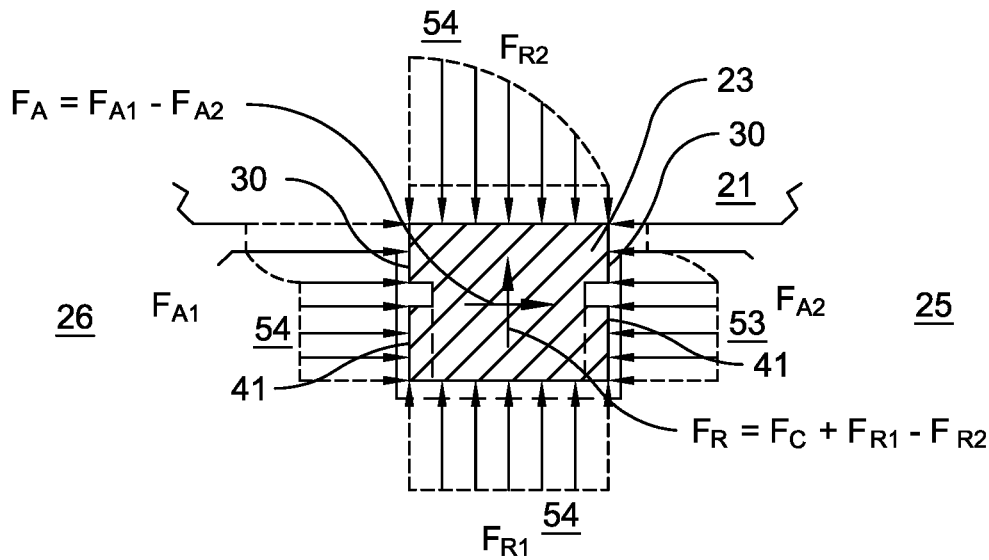
FIG. 6a is a diagram illustrating axial and radial forces about a primary sealing ring in accordance with an embodiment of the invention.

Referring now to FIG. 6a, gases residing within each of the lower-pressure side 25 and the higher-pressure side 26 may contact the primary sealing ring 23 and exert radial pressure forces ($F_{R1}$, $F_{R2}$) and axial pressure forces ($F_{A1}$, $F_{A2}$) thereon. The higher-pressure gas 54 may contact the inner diameter of the primary sealing ring 23 to exert an outwardly-directed radial pressure force ($F_{RO}$) and may also contact the outer sealing surface of the primary sealing ring 23 in part or whole to exert an inwardly-directed radial pressure force ($F_{R2}$). The radial pressure force ($F_{R2}$) may be disposed along an optional groove 62 along the inner diameter surface 29, as illustrated in FIGS. 2 and 4, which corresponds to a flame spray pocket containing a tungsten carbide or other wear-resistant coating. The primary sealing ring 23 also exerts a centrifugal force ($F_C$) which is radially-directed outward. The resultant radial force ($F_R$) is outwardly directed and equal to the centrifugal force ($F_C$) after adjustments for the radial pressure forces (+$F_{R1}$ and −$F_{R2}$). The translation-resistance force ($F_{TR}$) between the primary sealing ring 23 and the rotatable outer structure 21 is equal to product of the resultant radial force ($F_R$) and the coefficient of friction ($C_F$) between the primary sealing ring 23 and the rotatable outer structure 21.

Referring again to FIG. 6a, the higher-pressure gas 54 may contact one face 30 so as to exert an axial pressure force ($F_{A1}$) and the lower-pressure gas 53 may contact another face 30 so as to exert another axial pressure force ($F_{A2}$). The resultant axial force ($F_A$) is directed toward the lower-pressure side 25 and equal to the sum of the axial pressure forces (+$F_{A1}$, −$F_{A2}$). In preferred embodiments, the translation-resistance force ($F_{TR}$) is greater than the resultant axial force ($F_A$).

Figure 6B:
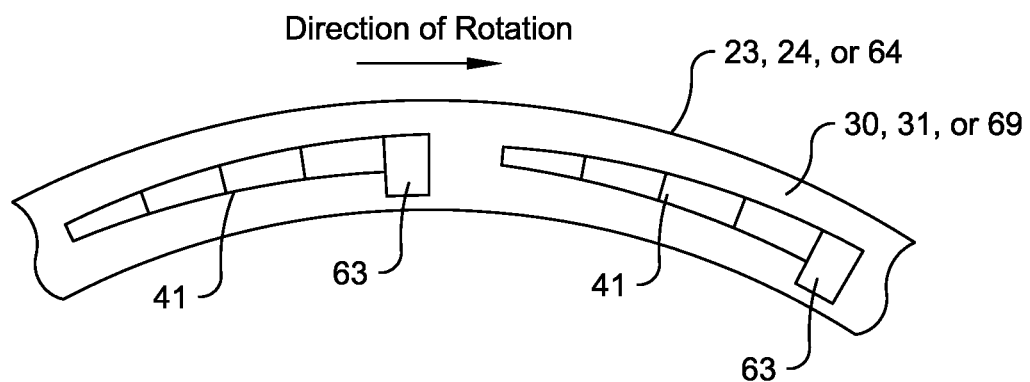
FIG. 6b is a partial side view illustrating a hydrodynamic groove along a face of a primary sealing ring, a face of a second primary sealing ring, or a wall of a translatable carrier in accordance with an embodiment of the invention.

Referring now to FIGS. 6a and 6b, some embodiments may include at least one hydrodynamic groove 41 along one or both faces 30 of the primary sealing ring 23 which forms a thin film with respect to the adjacent wall(s) 31 of the circumferential groove 27, the latter illustrated in FIGS. 2-5. The thin film(s) may limit frictional wear and heating to the primary sealing ring 23 by minimizing contact between a face 30 and a wall 31. The resultant pressure profiles about the primary sealing ring 23 may differ from that illustrated in FIG. 6a. Although a specific design for a hydrodynamic groove 41 is illustrated by way of example in FIG. 6b, the term hydrodynamic groove 41 is understood to include other designs capable of forming a thin film. Furthermore, it may be advantageous to include an optional inlet 63 at the input end to facilitate or to increase flow into the hydrodynamic groove 41.

Referring now to FIGS. 7a and 8, at least one first channel 35 passes through the translatable carrier 24 of the intershaft seal assembly 20 between the rotatable outer structure 21 and the inner structure 22, the latter which may include a sleeve portion 52 in some embodiments. Each first channel 35 traverses the center portion 47 of the translatable carrier 24 about the primary sealing ring 23. Preferred embodiments of the first channel 35 permit a lower-pressure gas 53 originating at the lower-pressure side 25 to flow through the first channel 35 and enter the lower-pressure chamber 33 without leakage into the circumferential groove 27, the higher-pressure side 26, or the higher-pressure chamber 34. Although a variety of linear and/or non-linear shapes are possible for the first channel 35, a preferred embodiment includes a vertically-oriented, linear cavity with a circular-shaped cross section which communicates at an inlet end 45 with the lower-pressure side 25 and at another end with one end of a horizontally-oriented, linear cavity with a circular-shaped cross section, the latter communicating at an outlet end 46 with the lower-pressure chamber 33. The preferred flow along the first channel 35 is from the inlet end 45 in the direction of the outlet end 46. However, it is understood that the lower-pressure gas 53 within the lower-pressure chamber 33 may reenter or otherwise flow into and along the first channel 35 when the volume of the lower-pressure chamber 33 decreases as the translatable carrier 24 axially translates toward the lower-pressure side 25.

Referring now to FIGS. 7b and 8, at least one second channel 36 passes through the translatable carrier 24 of the intershaft seal assembly 20 between the rotatable outer structure 21 and the inner structure 22. Each second channel 36 traverses the center portion 47 of the translatable carrier 24 about the primary sealing ring 23. Preferred embodiments of the second channel 36 permit a higher-pressure gas 54 originating at the higher-pressure side 26 to flow through the second channel 36 and enter the higher-pressure chamber 34 without leakage into the circumferential groove 27, the lower-pressure side 25, or the lower-pressure chamber 33. Although a variety of linear and non-linear shapes are possible for the second channel 36, a preferred embodiment includes a vertically-oriented, linear cavity with a circular-shaped cross section which communicates at an inlet end 45 with the higher-pressure side 26 and at another end with one end of a horizontally-oriented, linear cavity with a circular-shaped cross section, the latter communicating at an outlet end 46 with the higher-pressure chamber 34. The preferred flow along the second channel 36 is from the inlet end 45 in the direction of the outlet end 46. However, it is understood that the higher-pressure gas 54 within the higher-pressure chamber 34 may reenter or otherwise flow into and along the second channel 36 when the volume of the higher-pressure chamber 34 decreases as the translatable carrier 24 axially translates toward the higher-pressure side 26.

Referring now to FIG. 8, the inlet ends 45 of the first channels 35 may be separately spaced along the outer diameter surface 28 of the center portion 47 of the translatable carrier 24 adjacent to the lower-pressure side 25. The inlet ends 45 of the second channels 36 are likewise spaced along the outer diameter surface 28 of the center portion 47 adjacent to the higher-pressure side 26. In preferred embodiments, the locations of the inlet ends 45 of the first channels 35 are shifted or staggered, that is offset, with respect to the locations of the inlet ends 45 of the second channels 36. The secondary sealing rings 32 sealingly contact the flange portion 48 and the center portion 47 about each of the lower-pressure chamber 33 and the higher-pressure chamber 34.

Figure 9:
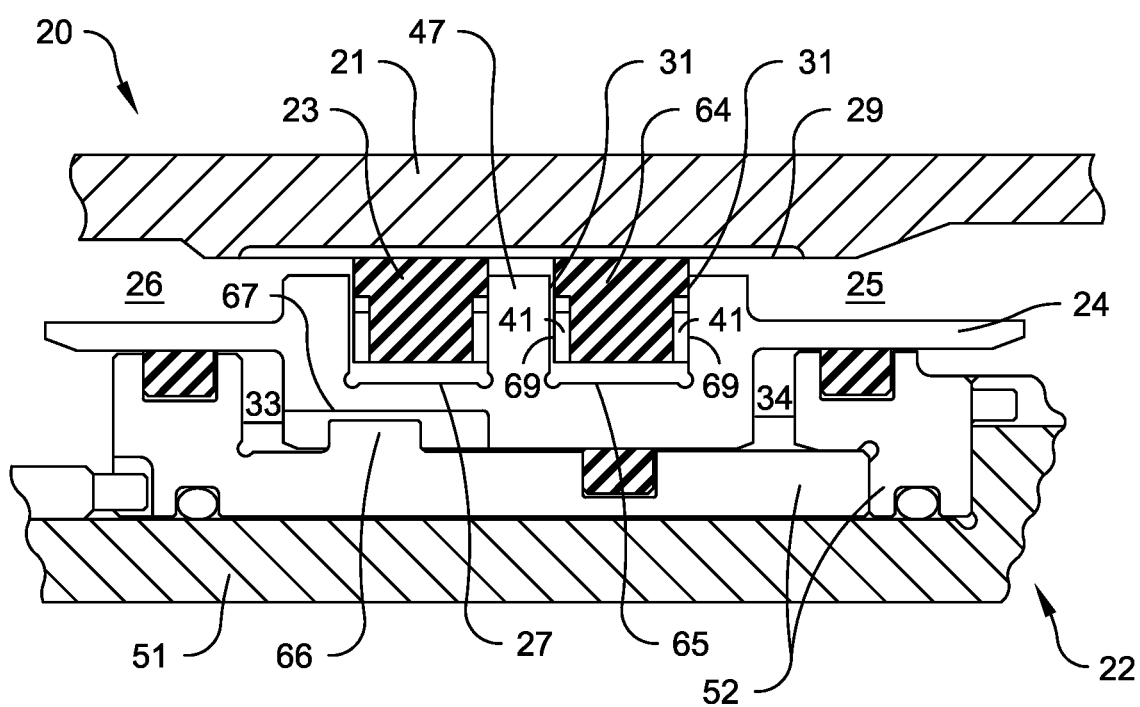
FIG. 9 is a cross-sectional view illustrating an intershaft seal assembly between a rotatable outer structure and an inner structure wherein a primary sealing ring is disposed within a groove about a translatable carrier, a second primary sealing ring is disposed within a second groove about the translatable carrier, and both primary sealing rings sealingly engage an inner diameter surface of the rotatable outer structure in accordance with an embodiment of the invention.

Referring now to FIG. 9, it may be advantageous to the various intershaft seal assemblies 20 described herein to include a primary sealing ring 23 and a second primary sealing ring 64 disposed between a rotatable outer structure 21 and an inner structure 22, the latter of which may include a shaft portion 51 and a sleeve portion 52 in yet other embodiments. One non-limiting application may be a high-differential pressure application wherein the paired arrangement of primary sealing rings 23, 64 spread the pressure drop between a higher-pressure side 26 and a lower-pressure side 25 over two seals with an intermediate pressure therebetween. The two-seal arrangement may reduce the contact force between a primary sealing ring 23 or 64 and a wall 31 of the circumferential groove 27 so as to reduce the rate of face wear.

Referring again to FIG. 9, the primary sealing ring 23 is disposed within a circumferential groove 27 within the center portion 47 of the translatable carrier 24 and adjacent to the higher-pressure side 26 and the lower-pressure chamber 33. The second primary sealing ring 64 is disposed within a second circumferential groove 65 along the center portion 47 of the translatable carrier 24 and adjacent to the lower-pressure side 25 and the higher-pressure chamber 34. The primary sealing ring 23 and the second primary sealing ring 64 may be the same, similar, or different designs and/or provide the same, similar, or different performance(s). The inner structure 22 or the sleeve portion 52 thereof may include a tab 66 which engages a similarly shaped slot 67 along the translatable carrier 24 to avoid or minimize relative rotational motion between the translatable carrier 24 and the inner structure 22 or the sleeve portion 52. The slot 67 should be sufficiently dimensioned so as to permit the range of axial translation required by the translatable carrier 24.

Referring now to FIGS. 9 and 6b, it may be advantageous to include at least one hydrodynamic groove 41 along one or both second faces 69 of the second primary sealing ring 64 which form a thin film with respect to the adjacent wall(s) 31 of the second circumferential groove 65. The thin film(s) may limit frictional wear and heating to the second primary sealing ring 64 by minimizing contact between a second face 69 and a wall 31. The resultant pressure profiles about the second primary sealing ring 64 may differ from that illustrated in FIG. 6a. Alternate embodiments may include hydrodynamic grooves 41 along both the primary sealing ring 23 and the second primary sealing ring 64.

Figure 10:
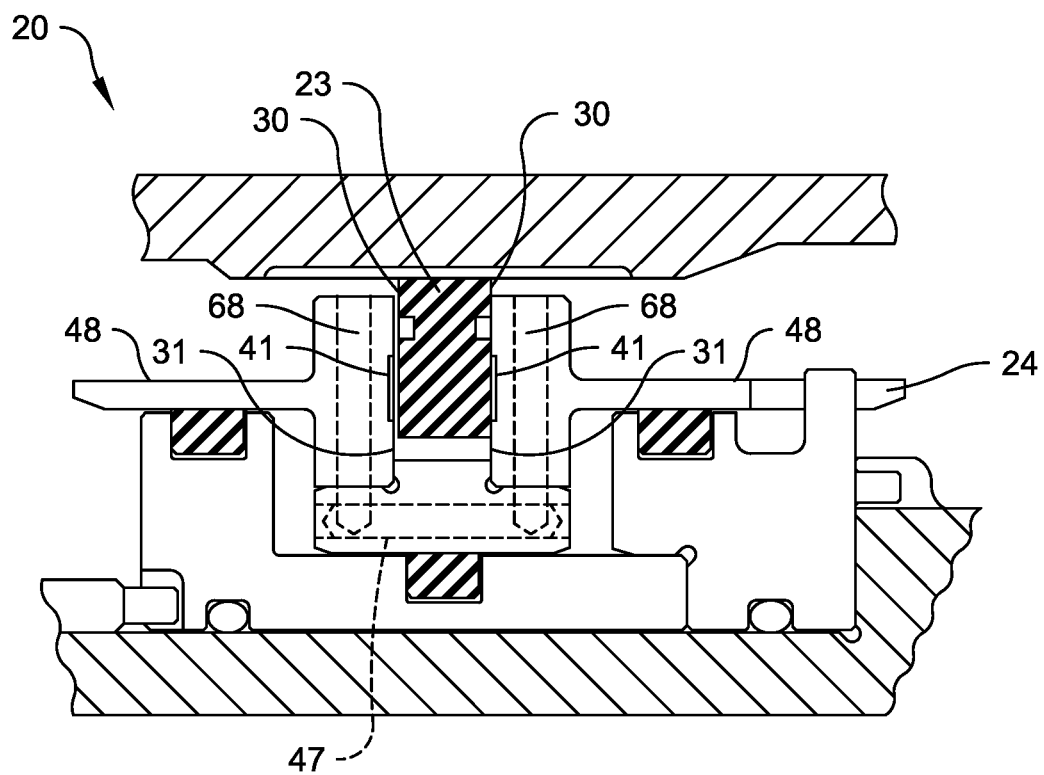
FIG. 10 is a cross-sectional view illustrating an intershaft seal assembly between a rotatable outer structure and an inner structure wherein a primary sealing ring is disposed within a groove about a translatable carrier, the translatable carrier includes a pair of flange portions fastened to a center portion, and hydrodynamic grooves are disposed along a wall of each flange portion in accordance with an embodiment of the invention.

Referring now to FIGS. 10 and 6b, it may be advantageous to the various intershaft seal assemblies 20 described herein to include at least one hydrodynamic groove 41 along one or both walls 31 of the translatable carrier 24. The translatable carrier 24 may need to be assembled from two or more components so as to enable manufacture of the hydrodynamic groove(s) 41. In one non-limiting example, the center portion 47 may be generally ring shaped and each flange portion 48 sidewardly T-shaped in cross section. Each flange portion 48 may be mechanically secured to the center portion 47 via one or more fasteners 68 so that the center portion 47 and the flange portions 48 in assembled form are identical or nearly identical in shape and/or function to other translatable carriers 24 described herein. The hydrodynamic groove(s) 41 form a thin film with respect to the adjacent face 30 of the primary sealing ring 23. The thin film(s) may limit frictional wear and heating to the primary sealing ring 23 by minimizing contact between a face 30 and a wall 31. The resultant pressure profiles about the primary sealing ring 23 may differ from that illustrated in FIG. 6a. The thin films formable by way of the various locations for the hydrodynamic grooves 41 described herein in combination with the translatability of the translatable carrier 24 reduce the possibility for interaction between a wall 31 and a face 30.

Figure 11:
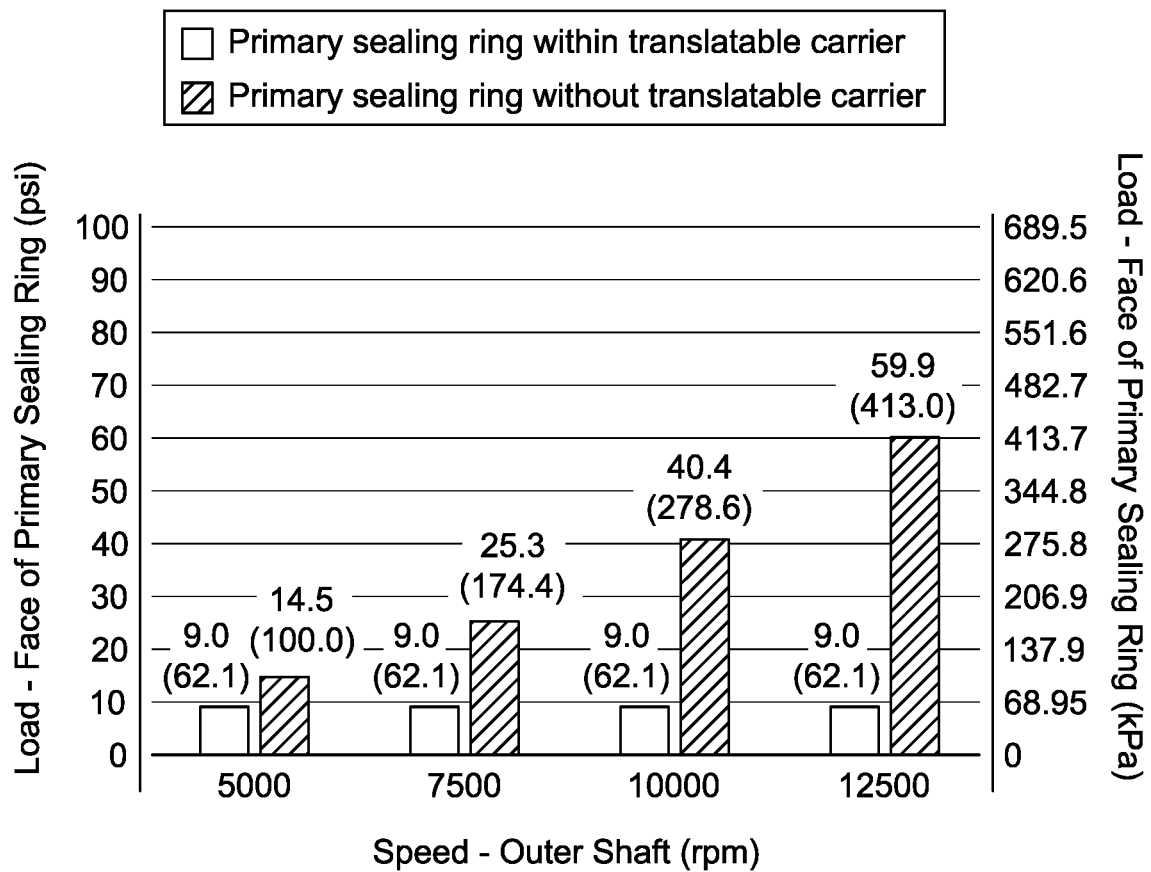
FIG. 11 is a bar chart illustrating load conditions along a face of a primary sealing ring with and without a translatable carrier at various speeds (and at constant pressure) for an outer shaft within an intershaft seal assembly including a rotatable outer structure and a non-rotatable inner structure in accordance with an embodiment of the invention.
Figure 12:
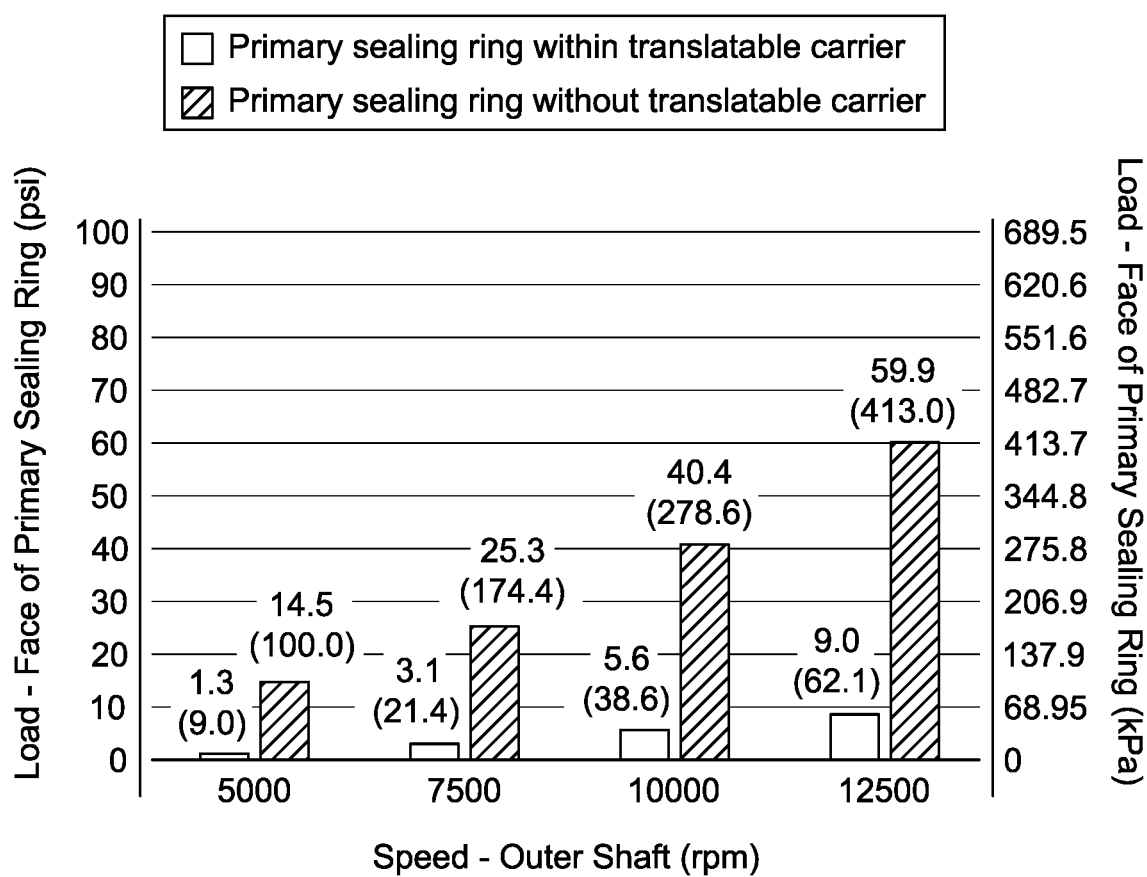
FIG. 12 is a bar chart illustrating load conditions along a face of a primary sealing ring with and without a translatable carrier at various speeds (and at constant pressure) for an outer shaft within an intershaft seal assembly including a rotatable outer structure and a rotatable inner structure in accordance with an embodiment of the invention.

Referring now to FIGS. 11 and 12, several comparisons are provided for illustrative purposes only to describe in non-limiting example form the benefits which may be made possible by the disclosure. The comparisons relate to the load communicated onto a face of a primary sealing ring when contacted by a wall of a circumferential groove along a translatable carrier. A higher load is indicative of greater frictional wear and frictional heating along the face onto which the load is applied. Actual benefits realized are design specific and therefore may be more or less than otherwise indicated in FIGS. 11 and 12.

Referring again to FIGS. 11 and 12, the estimated load is shown at each of four shaft speeds (at a differential pressure of 15 psi (103.4 kPa)) for intershaft seal assemblies with and without a translatable carrier between a rotatable outer structure and an inner structure, the latter not rotating in FIG. 11 and counter rotating with respect to the rotatable outer structure in FIG. 12. The outer shaft speed corresponds to the rotational speed of the rotatable outer structure or the specific form thereof, such as the runner or the outer shaft. In FIG. 11, the outer shaft speed is relative to the inner structure or non-movable frame. In FIG. 12, the outer shaft speed is twice the rotational speed of the inner structure or inner shaft. The estimated load at each outer shaft speed for an intershaft seal assembly with a translatable carrier is less than an intershaft seal assembly without a translatable carrier. The translatable carrier decouples the translation-resistance force due to the secondary sealing rings and the translatable carrier from the centrifugal force component of the translation-resistance force imposed by the primary sealing ring along the rotatable outer shaft. Irrespective of the relative improvements, the translatable carrier of the disclosure facilitates reduced wear along a face of a primary sealing ring and reduced heating by a primary sealing ring within an intershaft sealing application with and without rotation of the translatable carrier by the inner structure.

While the disclosure is susceptible to various modifications and alternative constructions, certain illustrative embodiments are shown in the drawings and are described in detail herein. It should be understood, however, there is no intention to limit the disclosure to the specific embodiments disclosed, but on the contrary, the intention is to cover all modifications, alternative constructions, combinations, and equivalents falling into the spirit and scope of the disclosure.

As is evident from the explanation herein, the disclosure in its various embodiments is applicable, but not limited, to circumferential sealing within a turbine engine between components disposed between a pressure differential.

What is claimed is:

1. An intershaft seal assembly for use between a rotatable outer structure and an inner structure within a turbine engine comprising:
    (a) a primary sealing ring;
    (b) a translatable carrier interposed between a lower-pressure side and a higher-pressure side, said translatable carrier comprises a center portion with a circumferential groove extending into said center portion and a pair of flange portions oppositely extending from said center portion, said center portion extends relative to said flange portions and toward each of said rotatable outer structure and said inner structure, said primary sealing ring disposed within and extends from said circumferential groove so as to sealingly engage an inner diameter surface of said rotatable outer structure, said primary sealing ring being rotatably movable within said circumferential groove so as to rotate with said rotatable outer structure;
    (c) at least one secondary sealing ring interposed between said translatable carrier and said inner structure, said translatable carrier slidingly contacts said at least one secondary sealing ring;
    (d) a lower-pressure chamber cooperatively formed by said center portion, one of said flange portions, and said inner structure adjacent to said higher-pressure side;
    (e) a higher-pressure chamber cooperatively formed by said center portion, one of said flange portions, and said inner structure adjacent to said lower-pressure side;
    (f) at least one first channel which traverses said translatable carrier so that a lower-pressure gas from said lower-pressure side may enter said lower-pressure chamber; and
    (g) at least one second channel which traverses said translatable carrier so as that a higher-pressure gas from said higher-pressure side may enter said higher-pressure chamber;
    wherein
        said translatable carrier being translatable with respect to both said rotatable outer structure and said inner structure;
        said translatable carrier being pressure balanced by said lower-pressure gas acting on said center portion and one of said flange portions at said lower-pressure side, by said lower-pressure gas acting on said center portion at said lower-pressure chamber between one of said flange portions and said inner structure, by said higher-pressure gas acting on said center portion and one of said flange portions at said higher-pressure side, and by said higher-pressure gas acting on said center portion at said higher-pressure chamber between one of said flange portions and said inner structure;
    a total translation-resistance force ($F_{TTR}$) at contact between said translatable carrier and said at least one secondary sealing ring being less than a translation-resistance force ($F_{TR}$) at contact between said rotatable outer structure and said primary sealing ring.

2. The intershaft seal assembly of claim 1, wherein said rotatable outer structure being a runner and said inner structure being a non-rotatable frame.

3. The intershaft seal assembly of claim 1, wherein said rotatable outer structure being an outer shaft and said inner structure being an inner shaft.

4. The intershaft seal assembly of claim 3, wherein said inner shaft being rotatable, said translatable carrier rotates with said inner shaft.

5. The intershaft seal assembly of claim 3, wherein said inner shaft being not rotatable.

6. The intershaft seal assembly of claim 1, wherein said primary sealing ring includes a pair of faces, at least one said face has at least one hydrodynamic groove.

7. The intershaft seal assembly of claim 1, wherein said at least one secondary sealing ring being spring energized and arranged to sealingly contact said translatable carrier and said inner structure.

8. The intershaft seal assembly of claim 1, wherein said at least one secondary sealing ring being a piston ring disposed within a groove about said inner structure, said at least one secondary sealing ring sealingly contacts said translatable carrier and said inner structure.

9. The intershaft seal assembly of claim 1, wherein said primary sealing ring includes a pair of faces, said at least one secondary sealing ring permits said translatable carrier to move relative to said inner structure when said translatable carrier comes in contact with one said face.

10. The intershaft seal assembly of claim 1, wherein said lower-pressure gas within each of said lower-pressure side and said lower-pressure chamber exerts an axial pressure force, said axial pressure force within said lower-pressure side opposes said axial pressure force within said lower-pressure chamber.

11. The intershaft seal assembly of claim 10, wherein said axial pressure forces ($F_1$, $F_2$) being equal.

12. The intershaft seal assembly of claim 1, wherein said higher-pressure gas within each of said higher-pressure side and said higher-pressure chamber exerts an axial pressure force ($F_3$, $F_4$), said axial pressure force ($F_3$) within said higher-pressure side opposes said axial pressure force ($F_4$) within said higher-pressure chamber.

13. The intershaft seal assembly of claim 12, wherein said axial pressure forces ($F_3$, $F_4$) being equal.

14. The intershaft seal assembly of claim 1, wherein said lower-pressure gas within said lower-pressure side and said higher-pressure gas within said higher-pressure chamber separately exert a first pair of axial pressure forces ($F_1$, $F_4$), said lower-pressure gas within said lower-pressure chamber and said higher-pressure gas within said higher-pressure side separately exert a second pair of axial pressure forces ($F_2$, $F_3$).

15. The intershaft seal assembly of claim 14, wherein said first pair of axial pressure forces ($F_1$, $F_4$) being opposed by and in total equal to said second pair of axial pressure forces ($F_2$, $F_3$).

16. The intershaft seal assembly of claim 1, wherein each said first channel includes an inlet end communicable with said lower-pressure side and an outlet end communicable with said lower-pressure chamber.

17. The intershaft seal assembly of claim 1, wherein each said second channel includes an inlet end communicable with said higher-pressure side and an outlet end communicable with said higher-pressure chamber.

18. The intershaft seal assembly of claim 1, wherein a slot being disposed along one said flange portion which engages a tab extending from said inner structure so that interaction between said slot and said tab limits translation of said translatable carrier with respect to said inner structure and prevents rotation of said translatable carrier relative to said inner structure.

19. The intershaft seal assembly of claim 1, wherein one said secondary sealing ring being interposed between and contacts one said flange portion and said inner structure.

20. The intershaft seal assembly of claim 1, wherein one said secondary sealing ring being interposed between and contacts said center portion and said inner structure.

21. The intershaft seal assembly of claim 1, wherein one said secondary sealing ring cooperates with one said flange portion, said center portion, and said inner structure to form said lower-pressure chamber.

22. The intershaft seal assembly of claim 1, wherein said flange portions being disposed about said center portion in a symmetric arrangement.

23. The intershaft seal assembly of claim 1, wherein said flange portions being disposed about said center portion in an asymmetric arrangement.

24. The intershaft seal assembly of claim 1, wherein said inner structure being an inner shaft which includes a shaft portion and a sleeve portion, said sleeve portion disposed about, contacting, and movable with said shaft portion, said sleeve portion interposed between said translatable carrier and said shaft portion.

25. The intershaft seal assembly of claim 24, wherein said at least one secondary sealing ring being a piston ring disposed within a groove about said sleeve portion, said at least one secondary sealing ring sealingly contacts said translatable carrier and said sleeve portion.

26. The intershaft seal assembly of claim 25, wherein at least one tertiary sealing ring sealing disposed between and sealingly contacts said sleeve portion and said shaft portion.

27. The intershaft seal assembly of claim 26, wherein said at least one tertiary sealing ring being an O-ring.

28. The intershaft seal assembly of claim 1, further comprising:
(h) a second primary sealing ring; and
(i) a second circumferential groove extending into said center portion, said second primary sealing ring disposed within and extends from said second circumferential groove so as to sealingly engage said inner diameter surface of said rotatable outer structure, said second primary sealing ring rotates with said rotatable outer structure.

29. The intershaft seal assembly of claim 28, wherein said second primary sealing ring includes a pair of second faces, at least one said second face has at least one hydrodynamic groove.

30. The intershaft seal assembly of claim 28, wherein said second primary sealing ring includes a pair of second faces, said at least one secondary sealing ring permits said translatable carrier to move relative to said inner structure when said translatable carrier comes in contact with one said second face.

31. The intershaft seal assembly of claim 28, wherein said circumferential groove has a pair of walls, said primary sealing ring disposed between said walls, at least one said wall has at least one hydrodynamic groove.

32. The intershaft seal assembly of claim 28, wherein said second circumferential groove has a pair of walls, said second primary sealing ring disposed between said walls, at least one said wall has at least one hydrodynamic groove.

33. The intershaft seal assembly of claim 1, wherein said circumferential groove has a pair of walls, said primary sealing ring disposed between said walls, at least one said wall has at least one hydrodynamic groove.

34. The intershaft seal assembly of claim 1, wherein said center portion disposed between and integral to said flange portions.

35. The intershaft seal assembly of claim 1, wherein said center portion disposed between and fastened to said flange portions.

36. The intershaft seal assembly of claim 35, wherein said circumferential groove has a pair of walls, said primary sealing ring disposed between said walls, at least one said wall has at least one hydrodynamic groove.

\* \* \* \* \*